United States Patent
Hamada et al.

(12) 
(10) Patent No.: US 6,430,122 B1
(45) Date of Patent: *Aug. 6, 2002

(54) RECORDING AND REPRODUCING SYSTEM HAVING RESUME FUNCTION

(75) Inventors: Toshiya Hamada, Saitama; Yasushi Fujinami, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 09/625,165

(22) Filed: Jul. 25, 2000

Related U.S. Application Data

(63) Continuation of application No. 09/174,698, filed on Oct. 19, 1998.

(30) Foreign Application Priority Data

Oct. 21, 1997 (JP) .............................................. 9-288182
Feb. 27, 1998 (JP) ........................................... 10-046859
Apr. 21, 1998 (JP) ........................................... 10-110349

(51) Int. Cl.⁷ .............................................. G11B 17/22
(52) U.S. Cl. .................. 369/30.36; 369/30.24
(58) Field of Search .......................... 369/30.24, 30.36, 369/30.27, 30.29, 30.1, 30.11

(56) References Cited

U.S. PATENT DOCUMENTS

| | | |
|---|---|---|
| 4,527,265 A | 7/1985 | d'Alayer de Costemore d'Arc |
| 4,706,233 A | 11/1987 | d'Alayer de Costemore d'Arc |
| 4,841,505 A * | 6/1989 | Aoyagi ..................... 369/30.36 |
| 4,878,129 A * | 10/1989 | Yasuda et al. ................ 386/125 |
| 5,122,999 A * | 6/1992 | Kimura et al. ............ 369/30.36 |
| 5,365,502 A * | 11/1994 | Misono .................... 369/30.36 |
| 5,457,672 A * | 10/1995 | Shinada et al. .......... 369/30.36 |
| 5,463,601 A * | 10/1995 | Yanagisawa .............. 369/30.36 |
| 5,471,442 A * | 11/1995 | Shimizume ............... 369/30.36 |
| 5,617,383 A | 4/1997 | Matsumoto et al. |
| 5,761,519 A * | 6/1998 | Wada et al. ................. 713/330 |
| 5,831,946 A * | 11/1998 | Bie .......................... 369/30.36 |
| 5,974,008 A * | 10/1999 | Lee .......................... 369/30.36 |

FOREIGN PATENT DOCUMENTS

| | | | |
|---|---|---|---|
| EP | 0 686 974 | 12/1995 | |
| JP | 4-349270 A | * 12/1992 | .............. 369/30.36 |
| JP | 11-297052 A | * 10/1999 | .............. 369/30.36 |
| WO | WO 97 08699 | 3/1997 | |

OTHER PUBLICATIONS

Patent Abstracts of Japan vol. 1998, No. 09, Jul. 31, 1998 & JP 10 097766 A (Toshiba Corp), Apr. 14, 1998.
Patent Abstracts of Japan vol. 1997, No. 07, Jul. 31, 1997 & JP 09 063192 A (Canon Inc), Mar. 7, 1997.
Patent Abstracts of Japan JP 10097766 Apr. 14, 1998.
Patent Abstracts of Japan JP 5 325509 vol. 18, No. 218 (P–1711), Dec. 10, 1993.

* cited by examiner

*Primary Examiner*—Tan Dinh
(74) *Attorney, Agent, or Firm*—Frommer Lawrence & Haug LLP; William S. Frommer; Bruno Polito

(57) ABSTRACT

When the user enters a command to eject an optical disc from an optical-disc apparatus by operating an input unit, a CPU records information such as an operating mode and a location accessed immediately prior to ejection of the disc into a RAM unit as resume-function related information. The resume-function related information is then supplied to the optical disc to be recorded thereon by way of a write-in channel buffer, a switch, an ECC circuit, an RF & demodulation/modulation circuit and an optical head. Accordingly it is possible to make an access to a location on an optical disc accessed immediately prior to ejection of the disc from an optical-disc apparatus when the disc is reinserted into the optical-disc apparatus.

63 Claims, 37 Drawing Sheets

| resume_mode_flag | Meaning |
|---|---|
| 0000b | reserved |
| 0001b | playback |
| 0010b | record(add) |
| 0011b | record(overwrite) |
| 0100b | autoplay |
| 0101b..1111b | reserved |

FIG. 2

| Syntax | Number of Bits | Mnemonic |
| --- | --- | --- |
| VOLUME.TOC{ | | |
|     file_type_id | 8*16 | char[16] |
|     volume_information() | | |
|     text_block() | | |
| } | | |

FIG. 3

| Syntax | Number of Bits | Mnemonic |
| --- | --- | --- |
| volume_information(){ | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
| --- | --- | --- |
| volume_attribute(){ | | |
|     volume_attribute_length | 32 | uimsbf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG. 5

| Syntax | Number of Bits | Mnemonic |
|---|---|---|
| resume() { | | |
|     resume_length | 32 | uimsbf |
|     reserved    // for byte alignment | 3 | bslbf |
|     resume_switch | 1 | bit |
|     reserved | 4 | bslbf |
|     number_of_records | 4 | uimsbf |
|     reserved    // for byte alignment | 7 | bslbf |
|     resume_auto_execute_time_flag | 1 | bit |
|     resume_auto_execute_time() | 4*14 | bcd |
|     reserved | 4 | bslbf |
|     resume_auto_execute_record_number | 4 | uimsbf |
|     for(i=0;i<number_of_records;i++) { | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
|         switch(object_type) { | | |
|             case title: | | |
|                 title_number | 16 | uimsbf |
|                 title_local_time_stamp | 64 | uimsbf |
|                 break; | | |
|             case program: | | |
|                 program_number | 16 | uimsbf |
|                 program_local_time_stamp | 64 | uimsbf |
|                 break; | | |
|             case program_bind: | | |
|                 program_bind_number | 16 | uimsbf |
|                 program_order | 16 | uimsbf |
|                 program_number | 16 | uimsbf |
|                 program_local_time_stamp | 64 | uimsbf |
|                 break; | | |
|             case play_item: | | |
|                 play_item_number | 16 | uimsbf |
|                 play_item_local_time_stamp | 64 | uimsbf |
|                 break | | |
|         } | | |
|     } | | |
| } | | |

FIG.6

| Syntax | Number of Bits | Mnemonic |
|---|---|---|
| volume_rating() { | | |
|    volume_rating_id | 8*16 | char[16] |
|    volume_rating_length | 32 | uimsbf |
|    reserved | 6 | bslbf |
|    volume_rating_type | 2 | bslbf |
|    volume_rating_password | 128 | bslbf |
|    switch (volume_rating_type) { | | |
|      case age_limited: | | |
|         number_of_rating | 8 | uimsbf |
|         for (i=0;i<number_of_rating;i++) { | | |
|             country_code_for_rating | 24 | bslbf |
|             age_for_volume_rating | 8 | uimsbf |
|         } | | |
|         break; | | |
|      case CARA: | | |
|         reserved | 4 | bslbf |
|         CARA_category | 4 | bslbf |
|         reserved | 24 | bslbf |
|         break; | | |
|      case RSAC: | | |
|         reserved | 4 | bslbf |
|         RSAC_category | 4 | bslbf |
|         reserved | 4 | bslbf |
|         RSAC_level | 4 | bslbf |
|         reserved | 16 | bslbf |
|         break; | | |
|    } | | |
| } | | |

FIG. 7

| Syntax | Number of Bits | Mnemonic |
|---|---|---|
| write_protect() { | | |
|     write_protect_length | 32 | uimsbf |
|     volume_write_protect_level | 4 | uimsbf |
|     password_enable_flag | 1 | bslbf |
|     append_only_flag | 1 | bslbf |
|     expiration_time_enable_flag | 1 | bslbf |
|     number_of_times_enable_flag | 1 | bslbf |
|     password_for_volume_write_protect | 128 | bslbf |
|     reserved | 8 | bslbf |
|     write_protect_set_time() | 56 | bcd |
|     reserved | 8 | bslbf |
|     write_protect_expiration_time() | 56 | bcd |
|     number_of_times | 16 | uimsbf |
| } | | |

FIG. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     reserved | 8 | bslbf |
|     play_protect_set_time() | 56 | bcd |
|     reserved | 8 | bslbf |
|     play_protect_expiration_time() | 56 | bcd |
|     number_of_times | 16 | uimsbf |
| } | | |

FIG. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0;i<number_of_entry;i++) { | | |
|         date_and_time | | |
|         channel | | |
|         program | | |
|         : | | |
|     } | | |
| } | | |

FIG. 10

| Syntax | Number of Bits | Mnemonic |
|---|---|---|
| text_block() { | | |
|     text_block_length | 32 | uimsbf |
|     number_of_language_sets | 8 | uimsbf |
|     number_of_text_items | 16 | uimsbf |
|     for(i=0;i<number_of_language_sets;i++) { | | |
|         language_set() | | |
|     } | | |
|     for(i=0;i<number_of_text_items;i++) { | | |
|         text_item() | | |
|     } | | |
| } | | |

FIG. 11

| Syntax | Number of Bits | Mnemonic |
|---|---|---|
| language_set() { | | |
|     reserved | 8 | bslbf |
|     language_code | 24 | bslbf |
|     character_set_type | 8 | bslbf |
|     number_of_language_set_names | 8 | uimsbf |
|     for(i=0;i<number_of_language_set_names;i++) { | | |
|         character_set_type_for_name | 8 | bslbf |
|         language_set_name_length | 8 | uimsbf |
|         language_set_name | 8*language_set_name_length | bslbf |
|     } | | |
| } | | |

FIG. 12

| Syntax | Number of Bits | Mnemonic |
|---|---|---|
| text_item() { | | |
|    text_item_length | 16 | uimsbf |
|    text_item_id | 16 | uimsbf |
|    text_item_sub_id | 16 | uimsbf |
|    flags | 8 | bslbf |
|    number_of_used_language_sets | 8 | uimsbf |
|    //loop for each language set | | |
|    for(i=0;i<number_of_used_language_sets;i++) { | | |
|       language_set_id | 8 | uimsbf |
|       reserved | 4 | bslbf |
|       text_string_length | 16 | uimsbf |
|       text_string | 8*text_string_length | bslbf |
|       bitmap() | | |
|    } | | |
|    stuffing_bytes | 8*n | bslbf |
| } | | |

FIG. 13

| Syntax | Number of Bits | Mnemonic |
|---|---|---|
| ALBUM.STR{ | | |
|    file_type_id | 8*16 | char[16] |
|    album() | | |
|    text_block() | | |
| } | | |

FIG. 14

| Syntax | Number of Bits | Mnemonic |
|---|---|---|
| album() { | | |
|     album_length | 32 | uimsbf |
|     reserved | 6 | bslbf |
|     volume_status | 1 | bslbf |
|     if (volume_status== "1b" ) { | | |
|        chief_volume_flag | 1 | bslbf |
|     } else { | | |
|        reserved | 1 | "0" |
|     } | | |
|     if (volume_status== "1b" ) { | | |
|       if (chief_volume_flag== "1b" ) { | | |
|         reserved | 6 | bslbf |
|         album_type | 2 | bslbf |
|         albim_id | 128 | bslbf |
|           number_of_discs_in_album | 16 | uimsbf |
|           number_of_volumes_in_album | 16 | uimsbf |
|           for (i=0;i<number_of_volumes_in_album;i++) { | | |
|              disc_id_for_album_member | 128 | bslbf |
|              volume_id_for_album_member | 128 | bslbf |
|              title_offset_number | 16 | uimsbf |
|           } | | |
|           reserved_for_program_bind | 8 | bslbf |
|           number_of_program_binds | 8 | uimsbf |
|           for (i=0;i<number_of_program_binds;i++) { | | |
|              number_of_program_in_this_program_bind | 16 | uimsbf |
|              for(i=0;i<number_of_programs_in_this_program_bind;i++) { | | |
|                 disc_id_for_program_bind_member | 128 | uimsbf |
|                 volume_id_for_program_bind_member | 128 | uimsbf |
|                 program_number | 16 | uimsbf |
|              } | | |
|           } | | |
|       }else{          //chief_volume_flag== "0b" | | |
|         chief_disc_id | 128 | uimsbf |
|         chief_volume_id | 128 | uimsbf |
|         (album_id | 128 | bslbf |
|       } | | |
|     } | | |
| } | | |

FIG. 15

| Syntax | Number of Bits | Mnemonic |
|---|---|---|
| TITLE_###. VDR{ | | |
|     file_type_id | 8*16 | char [16] |
|     title_info() | | |
|     text_block() | | |
| } | | |

FIG. 16

| Syntax | Number of Bits | Mnemonic |
|---|---|---|
| title_info() { | | |
|     title_info_length | 32 | uimsbf |
|     flags_for_title | 32 | bslbf |
|     cgit_file_id | 16 | uimsbf |
|     title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for (i=0;i<number_of_marks;i++) { | | |
|         reserved | 4 | bslbf |
|         mark_type | 4 | bslbf |
|         mark_chunk_group_time_stamp | 64 | uimsbf |
|     } | | |
|     stuffing_bytes | 8*n | bslbf |
| } | | |

FIG. 17

| Syntax | Number of Bits | Mnemonic |
|---|---|---|
| PROGRAM_$$$.PGI { | | |
|     file_type_id | 8*16 | char[16] |
|     program() | | |
|     text_block() | | |
| } | | |

FIG. 18

| Syntax | Number of Bits | Mnemonic |
|---|---|---|
| program() { | | |
|     program_length | 32 | uimsbf |
|     flags_for_program | 32 | bslbf |
|     program_status | 4 | bslbf |
|     program_playback_time() | 32 | bcd |
|     reserved | 32 | bslbf |
|     number_of_play_sequences | 16 | uimsbf |
|     for(j=0;j<number_of_play_sequence;j++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

FIG. 19

| Syntax | Number of Bits | Mnemonic |
|---|---|---|
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=1;PIN<=number_of_play_items_in_program;PIN++) { | | |
|         play_item() | | |
|     } | | |
| } | | |

FIG. 20

| Syntax | Number of Bits | Mnemonic |
|---|---|---|
| play_item() { | | |
|     play_item_length | 32 | uimsbf |
|     play_item_type | 8 | bslbf |
|     play_mode | 8 | bslbf |
|     total_playback_time() | 32 | bcd |
| | | |
|     menu_item_number | 16 | uimsbf |
|     return_item_number | 16 | uimsbf |
|     next_item_number | 16 | uimsbf |
|     prev_item_number | 16 | uimsbf |
| | | |
|     if(play_item_type= "0000b" ){ | | |
|       //play item for one "cut" | | |
|       title_number | 16 | uimsbf |
|       //IN point | | |
|       item_start_time_stamp | 64 | uimsbf |
|       //OUT point | | |
|       item_end_time_stamp | 64 | uimsbf |
|     } | | |
| } | | |

FIG. 21

| Syntax | Number of Bits | Mnemonic |
|---|---|---|
| CHUNKGROUP_###.CGIT{ | | |
|     file_type_id | 8*16 | char[16] |
| | | |
|     chunkgroup_time_base_flags | 32 | bslbf |
|     chunkgroup_time_base_offset | 64 | uimsbf |
| | | |
|     chunk_connection_info() | | |
|     text_block() | | |
| } | | |

FIG. 22

| Syntax | Number of Bits | Mnemonic |
|---|---|---|
| chunk_connection_info() { | | |
|     chunk_connection_info_length | 32 | uimsbf |
|     reserved | 16 | bslbf |
|     number_of_chunks | 16 | uimsbf |
|     chunk_sync_play_flag | 8 | bslbf |
|     // chunk info file list | | |
|     for( i =0; i <number_of_chunks; i++) { | | |
|         chunk_arrangement_info() | | |
|     } | | |
| } | | |

FIG. 23

| Syntax | Number of Bits | Mnemonic |
|---|---|---|
| chunk_arrangement_info() { | | |
|     chunk_arrangement_info_length | 32 | uimsbf |
|     chunk_info_file_id | 16 | bslbf |
|     reserved | 5 | bslbf |
|     chunk_switch_stream_id | 16 | bslbf |
| | | |
|     presentation_start_cg_time_count | 64 | uimsbf |
|     presentation_end_cg_time_count | 64 | uimsbf |
| | | |
|     reserved | 4 | bslbf |
|     chunk_time_count_type | 4 | bslbf |
|     number_of_start_original_time_count_extension | 8 | uimsbf |
|     number_of_end_original_time_count_extension | 8 | uimsbf |
| | | |
|     // presentation start position and time | | |
|     presentation_start_original_time_count | 64 | uimsbf |
|     presentation_end_original_time_count | 64 | uimsbf |
| | | |
|     for(i=0;j<number_of_start_original_time_count_extension;j++) | | |
|         tc_ext_attributes | 16 | bslbf |
|         start_original_time_count_extension | 64 | uimsbf |
|     } | | |
| | | |
|     // presentation end position and time | | |
|     for(k=0;k<number_of_end_original_time_count_extension;k++) { | | |
|         tc_ext_attributes | 16 | bslbf |
|         end_original_time_count_extension | 64 | uimsbf |
|     } | | |
|     transition_info() | | |
| } | | |

FIG. 24

| Syntax | Number of Bits | Mnemonic |
|---|---|---|
| CHUNK_XXXX.ABST{ | | |
|     file_type_id | 8*16 | char[16] |
|     reserved | 4 | bslbf |
|     chunk_file_id | 16 | uimsbf |
|     info_type | 4 | bslbf |
|     //stream_info() | | |
| | | |
|     if (info_type== "MPEG2_System_TS" ) { | | |
|         number_of_programs | 8 | uimsbf |
|     else { | | |
|         number_of_programs | 8 | "0000 0001" |
|     } | | |
|     for(i=0;i<number_of_programs;i++){ | | |
|         number_of_streams | 8 | uimsbf |
|         for (i=0;i<number_of_streams;i++) { | | |
|             stream_identifier | 16 | bslbf |
| | | |
|             //slot type information | 4 | |
|             reserved | 4 | bslbf |
|             slot_unit_type | | bslbf |
|             if (slot_unit_type== "time_stamp" ) { | 32 | |
|                 slot_time_length | | uimsbf |
|             } else { | 32 | |
|                 reserved | | bslbf |
|             } | 32 | |
|             number_of_slots | 4 | uimsbf |
|             reserved | | bslbf |
|             switch(info_type) | | |
|                 case MPEG1_System: | | |
|                 case MPEG2_System_PS: | | |
|                 case MPEG2_System_TS: | | |
|                 case video_elementary_stream | 4 | |
|                     number_of_I_pictures_in_slot | | uimsbf |
|                     break; | | |
|                 default: | 4 | |
|                     reserved | | bslbf |
|                     break; | | |
|             } | | |
| | | |
|             //stream attribute | | |
|             ES_attribute() | | |
|     } | | |
| | | |
|     //loop of slot info | | |
|     for (i=0;i<number_of_streams;i++) { | | |
|         for (i=0;i<number_of_slots;i++) { | | |
|             slot_info() | | |
|         } | | |
|     } | | |
|     } | | |
| } | | |

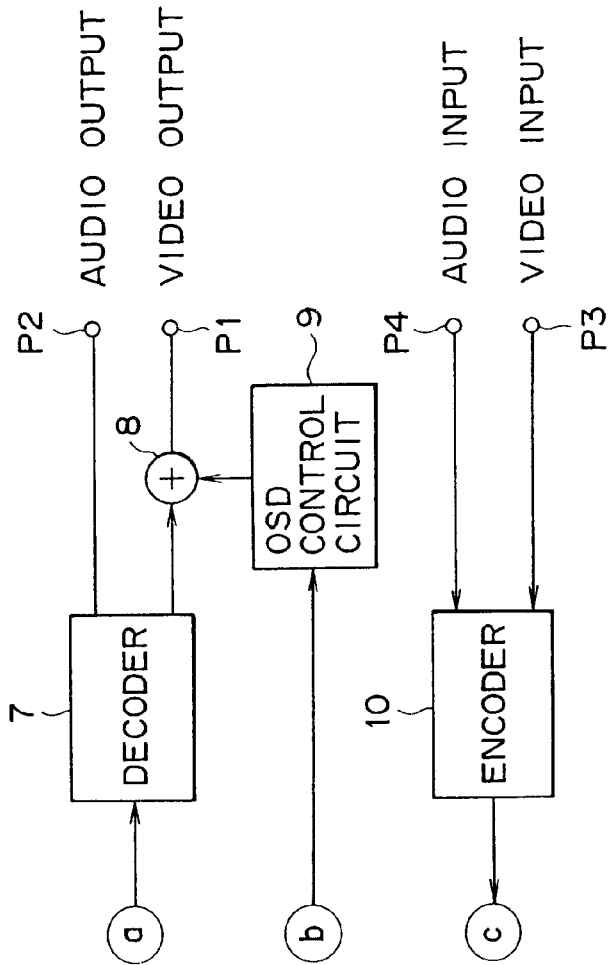
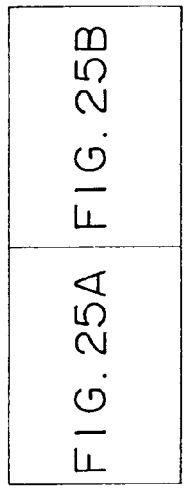

FIG.26

```
|———VOLUME.TOC
 —ALBUM.STR
 —PROGRAM
 |      —PROGRAM_001.PGI
 —TITLE
 |      —TITLE_001.VDR
 |      —TITLE_002.VDR
 |      —TITLE_003.VDR
 |
 —CHUNKGROUP
 |      —CHUNKGROUP_001.CGIT
 |      —CHUNKGROUP_002.CGIT
 |
 —CHUNK
 |      —CHUNK_0001.ABST
 |      —CHUNK_0011.ABST
 |      —CHUNK_0012.ABST
 |
 —MPEGAV
        —STREAMS_001
        |       —CHUNK_0001.MPEG2
        |
        —STREAMS_002
        |       —CHUNK_0011.MPEG2
        |       —CHUNK_0012.MPEG2
```

FIG. 29

```
/-----MPEGAV
|     -STREAMS_003
|     |     -CHUNK_0031.MPEG2
```

FIG. 30

```
/---VOLUME.TOC
   -ALBUM.STR
   -PROGRAM
   |     -PROGRAM_001.PGI
   -TITLE
   |     -TITLE_001.VDR
   |     -TITLE_002.VDR
   |     -TITLE_003.VDR
   |     -TITLE_004.VDR*
   |
   -CHUNKGROUP
   |     -CHUNKGROUP_001.CGIT
   |     -CHUNKGROUP_002.CGIT
   |     -CHUNKGROUP_003.CGIT*
   |
   -CHUNK
   |     -CHUNK_0001.ABST
   |     -CHUNK_0011.ABST
   |     -CHUNK_0012.ABST
   |     -CHUNK_0031.ABST*
   |
   -MPEGAV
   |     -STREAMS_001
   |     |     -CHUNK_0001.MPEG2
   |     |
   |     -STREAMS_002
   |     |     -CHUNK_0011.MPEG2
   |     |     -CHUNK_0012.MPEG2
   |     |
   |     -STREAMS_003*
   |     |     -CHUNK_0031.MPEG2*
   |     |
```

FIG. 32

```
/-----MPEGAV
     |     -STREAMS_002
     |     |       -CHUNK_0031.MPEG2
```

FIG. 33

```
/---VOLUME.TOC
   -ALBUM.STR
   -PROGRAM
   |     -PROGRAM_001.PGI
   -TITLE
   |     -TITLE_001.VDR
   |     -TITLE_002.VDR
   |     -TITLE_003.VDR
   |     -TITLE_004.VDR*
   |
   -CHUNKGROUP
   |     -CHUNKGROUP_001.CGIT
   |     -CHUNKGROUP_002.CGIT
   |
   -CHUNK
   |     -CHUNK_0001.ABST
   |     -CHUNK_0011.ABST
   |     -CHUNK_0012.ABST
   |     -CHUNK_0031.ABST*
   |
   -MPEGAV
   |     -STREAMS_001
   |     |       -CHUNK_0001.MPEG2
   |     |
   |     -STREAMS_002
   |     |       -CHUNK_0011.MPEG2
   |     |       -CHUNK_0012.MPEG2
   |     |       -CHUNK_0031.MPEG2*
   |     |
```

FIG. 36

| resume_switch | Meaning |
|---|---|
| 0b | disabled |
| 1b | enabled |

FIG. 37

| resume_auto_execute_time_flag | Meaning |
|---|---|
| 0b | resume_auto_execute_time() is invalid |
| 1b | valid |

FIG. 38

| resume_mode_flag | Meaning |
|---|---|
| 0000b | reserved |
| 0001b | playback |
| 0010b | record(add) |
| 0011b | record(overwrite) |
| 0100b | autoplay |
| 0101b..1111b | reserved |

FIG. 39

| object_type | Meaning |
|---|---|
| 0000b | reserved |
| 0001b | title |
| 0010b | program |
| 0011b | program_bind |
| 0100b | play_item |
| 0101b..1111b | reserved |

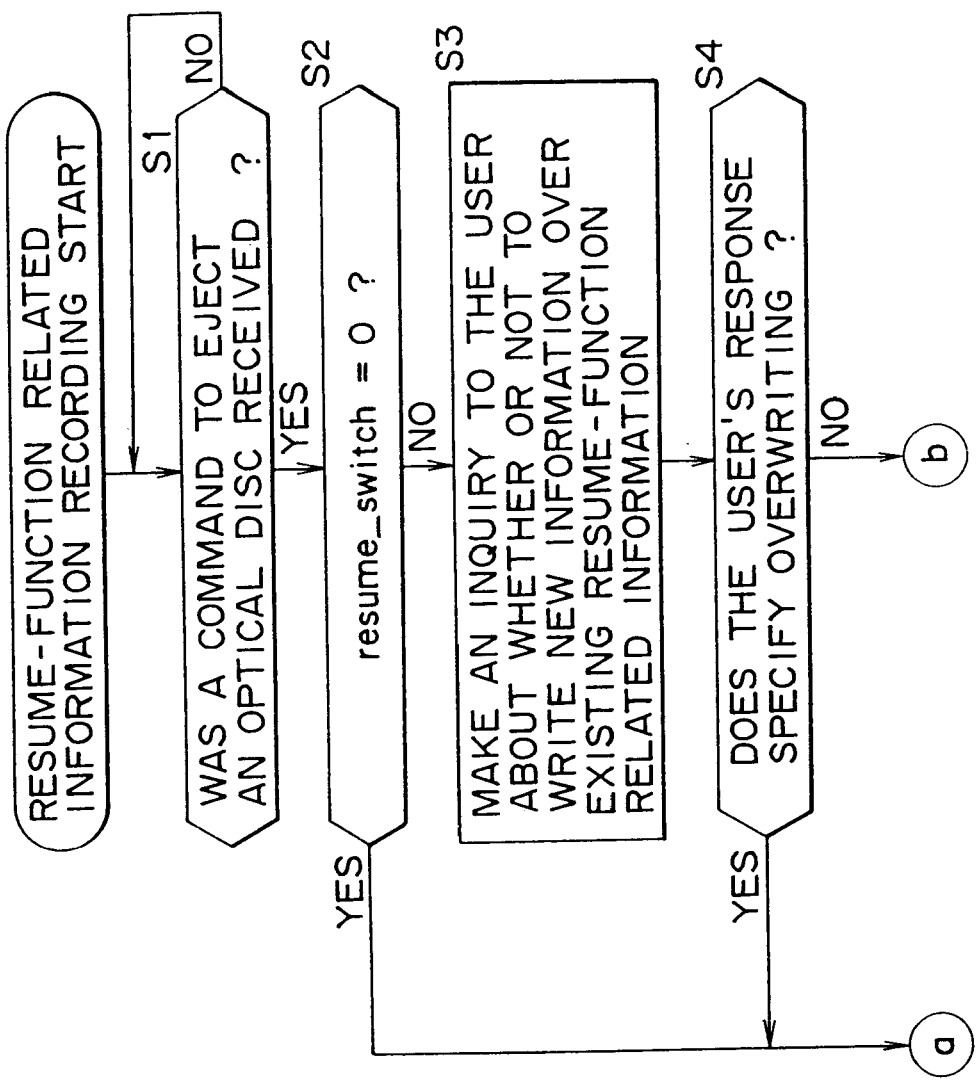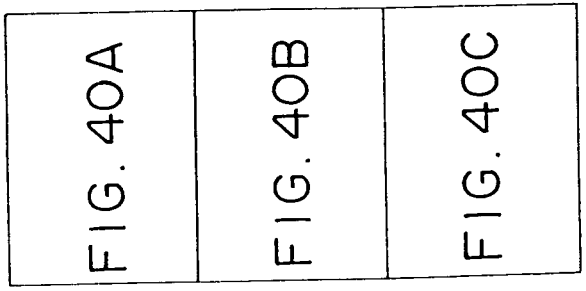
FIG. 40A
FIG. 40

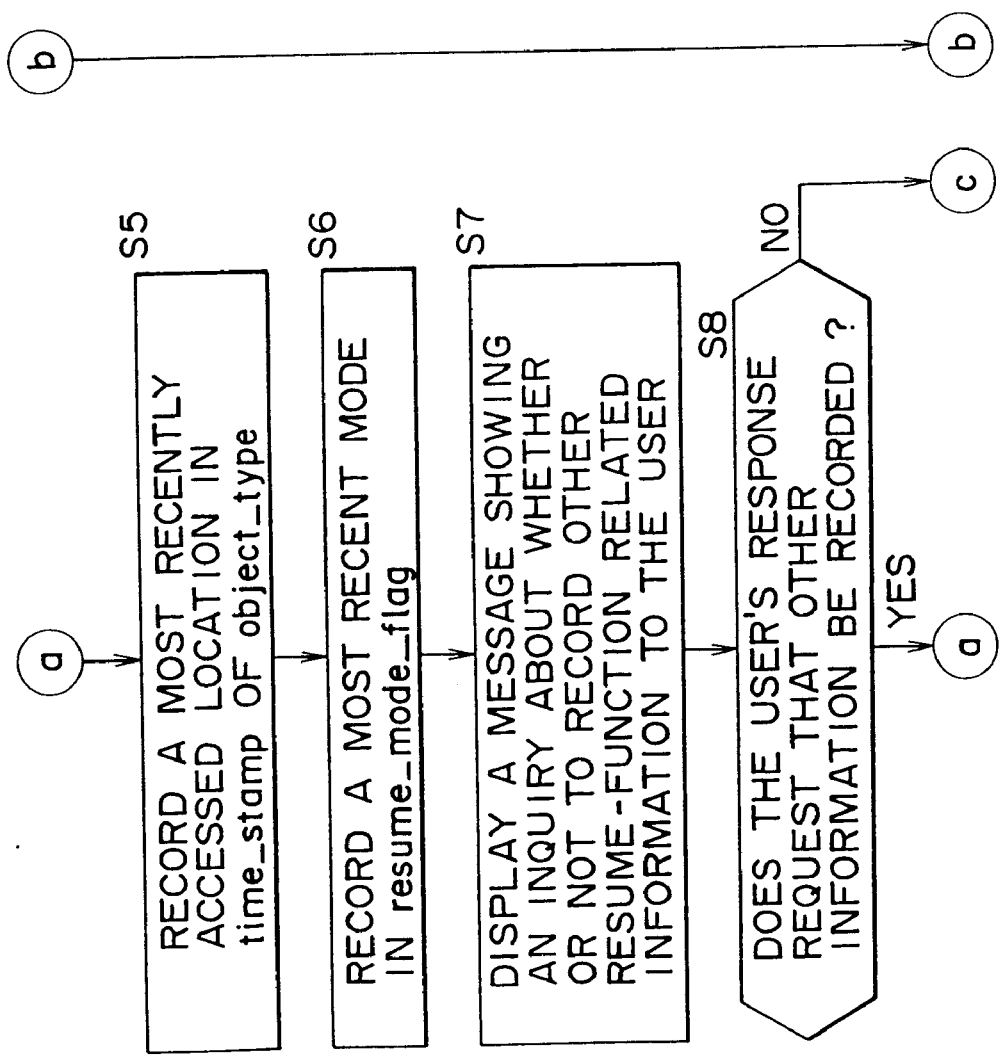

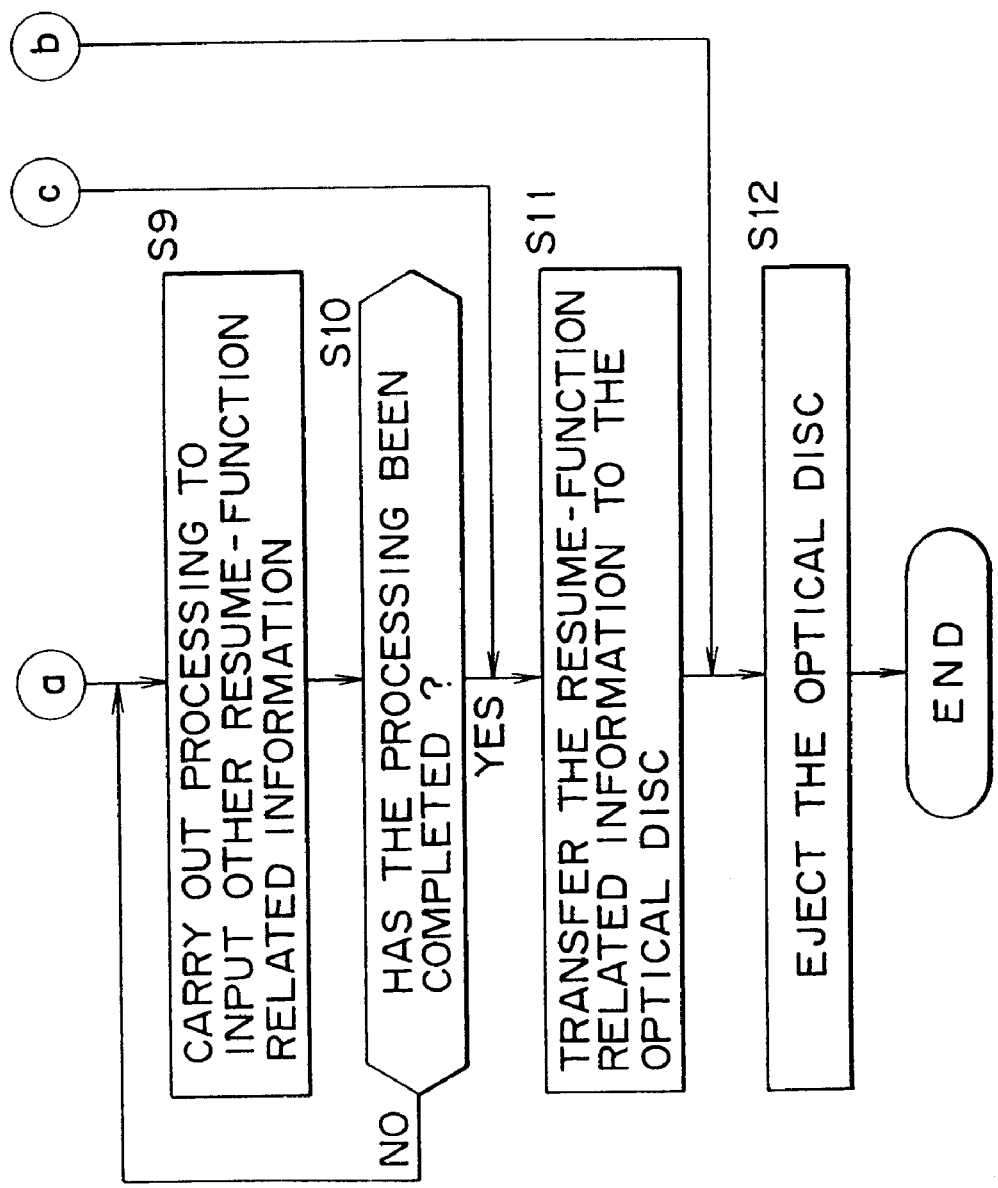

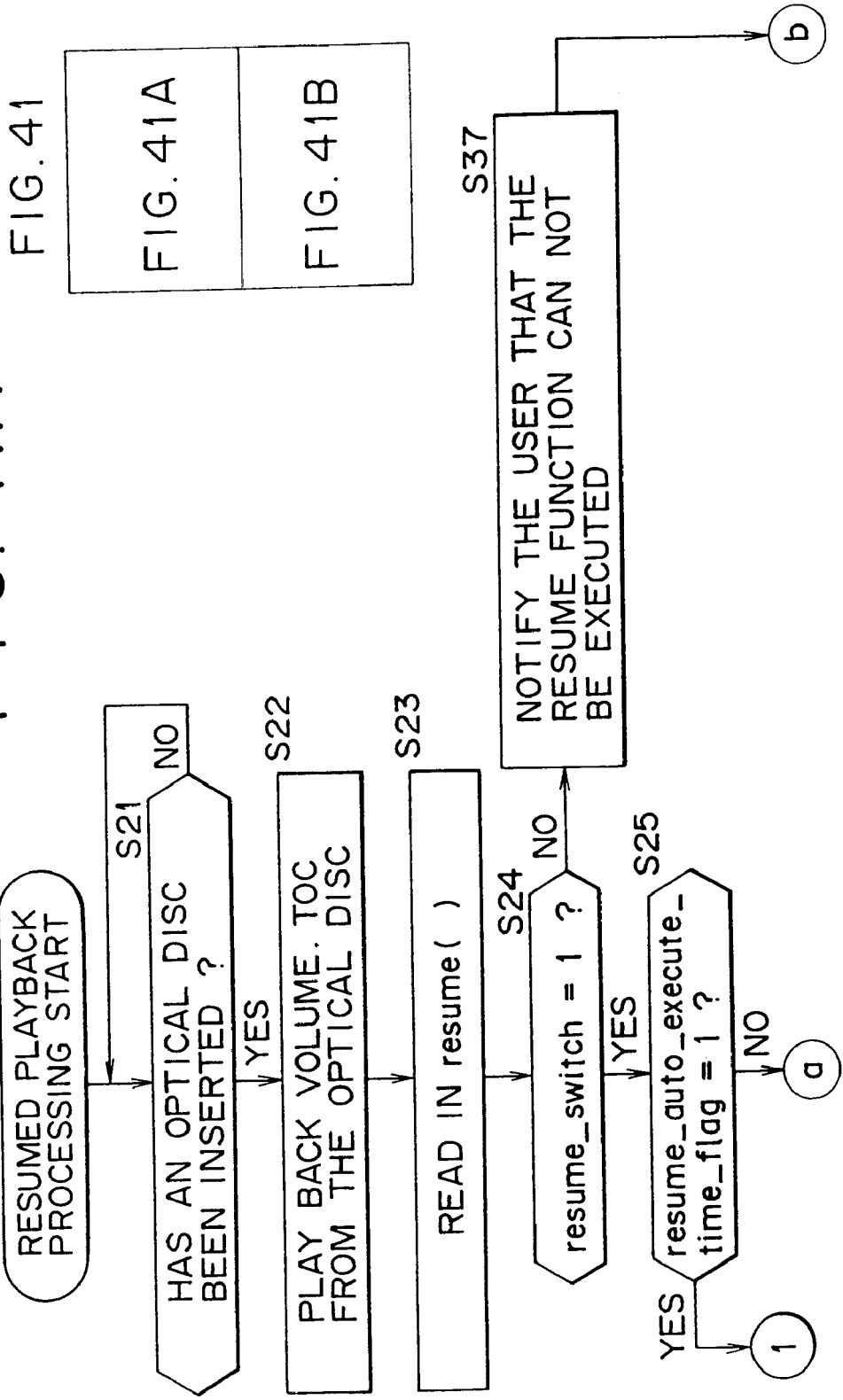

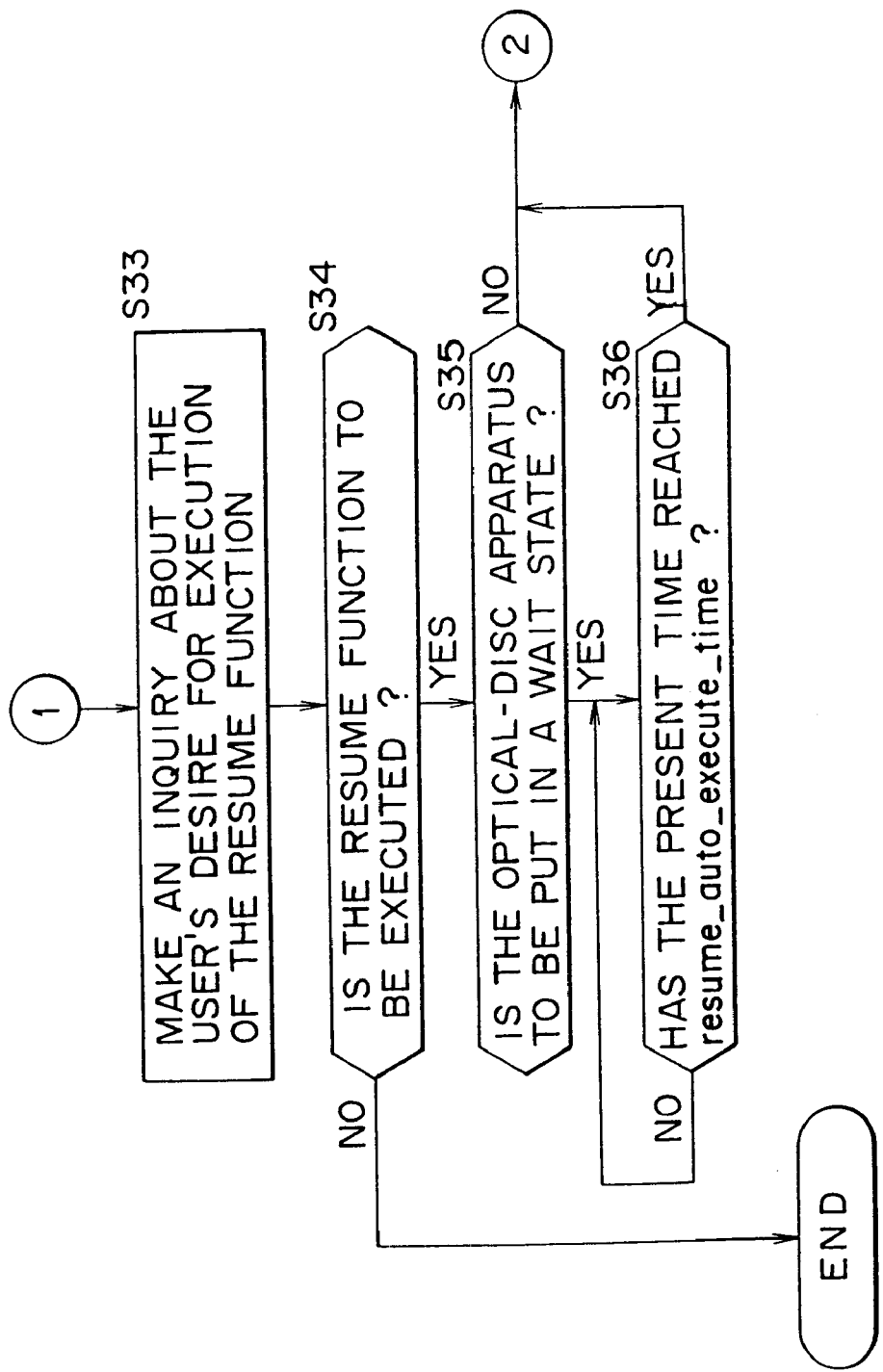

FIG. 43

| Syntax | Number of Bits | Mnemonic |
|---|---|---|
| resume() { | | |
|     resume_length | 32 | uimsbf |
|     reserved    //for byte alignment | 3 | bslbf |
|     resume_switch | 1 | bit |
|     reserved | 4 | bslbf |
|     number_of_records | 4 | uimsbf |
| | | |
|     reserved    //for byte alignment | 7 | bslbf |
|     for(i=0;i<number_of_records, i++) { | | |
|         resume_mode_flag | 4 | bslbf |
|         object_type | 4 | bslbf |
|         logical_input_source_number | 16 | bslbf |
|         resume_start_time() | 4*14 | bcd |
|         resume_end_time() | 4*14 | bcd |
|         holding_flag | 1 | bslbf |
|         maximum_mux_rate | 16 | bslbf |
|         resume_updated_time() | 4*14 | bcd |
| | | |
|         switch(object_type) { | | |
|             case title: | | |
|                 title_number | 16 | uimsbf |
|                 title_local_time_stamp | 64 | uimsbf |
|                 break; | | |
|             case program: | | |
|                 program_number | 16 | uimsbf |
|                 program_local_time_stamp | 64 | uimsbf |
|                 break; | | |
| | | |
|             case program_bind: | | |
|                 program_bind_number | 16 | uimsbf |
|                 program_order | 16 | uimsbf |
|                 program_number | 16 | uimsbf |
|                 program_local_time_stamp | 64 | uimsbf |
|                 break; | | |
| | | |
|             case play_item: | | |
|                 play_item_number | 16 | uimsbf |
|                 play_item_local_time_stamp | 64 | uimsbf |
|                 break; | | |
|         } | | |
|     } | | |
| } | | |

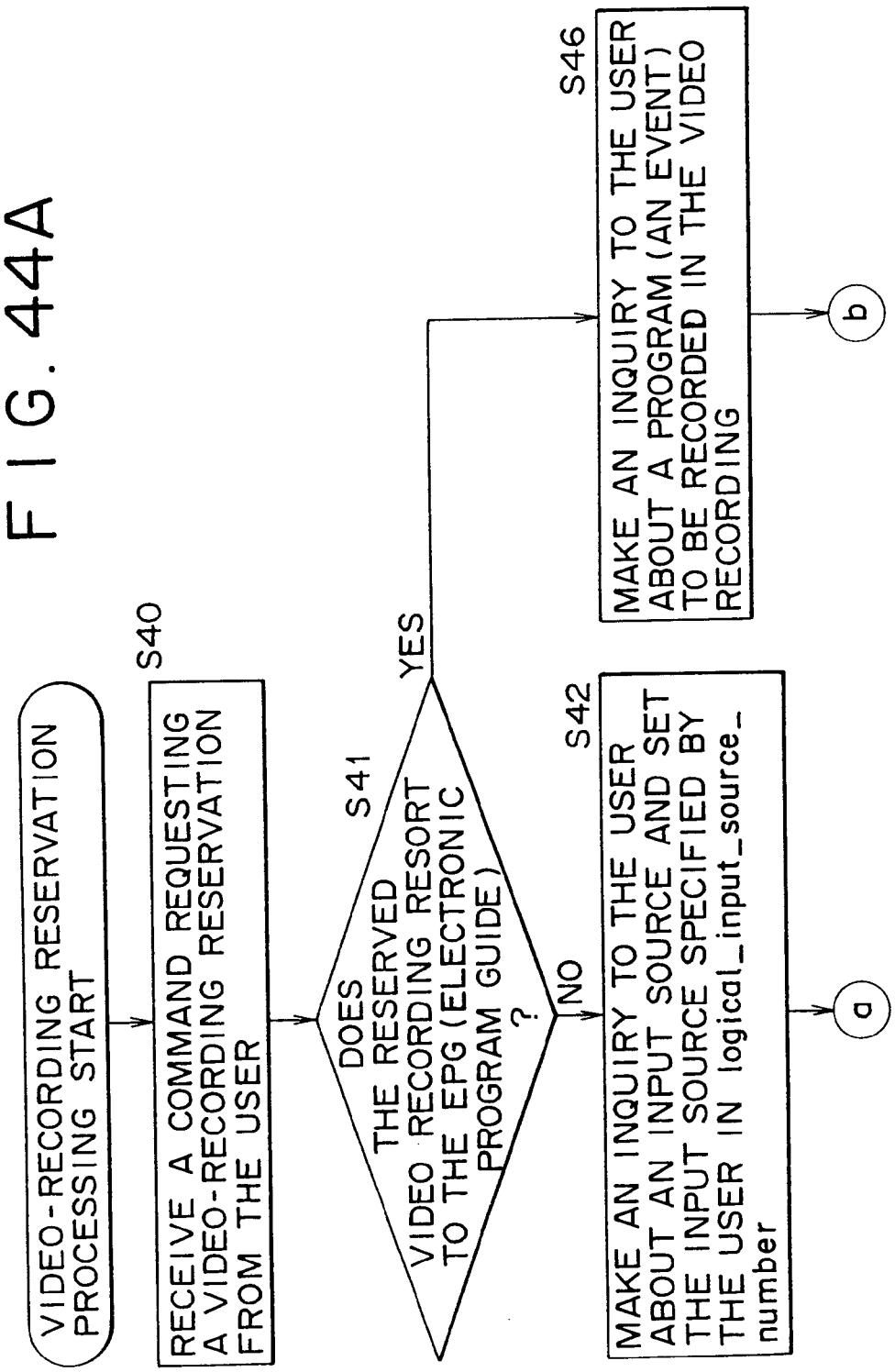

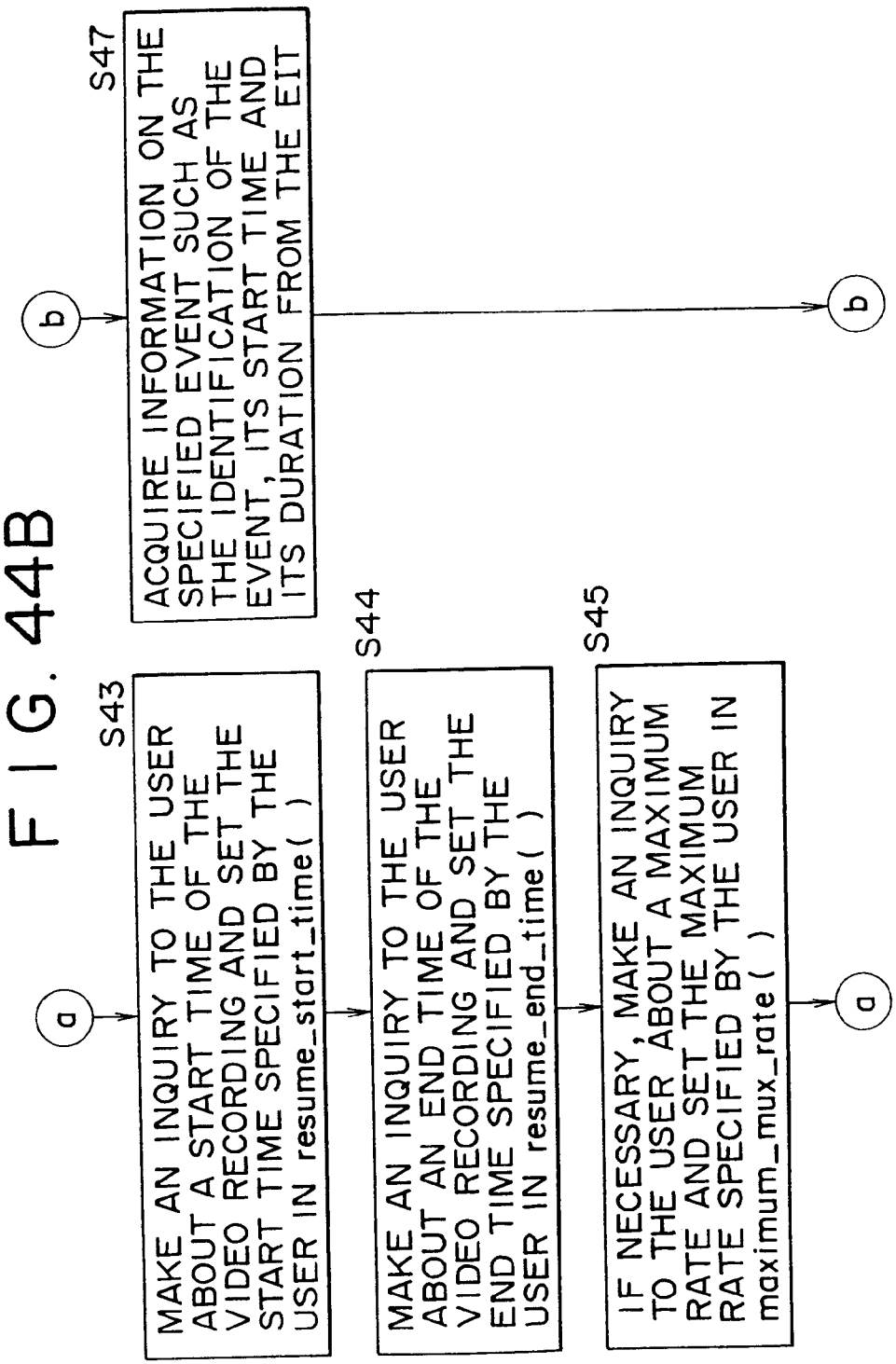

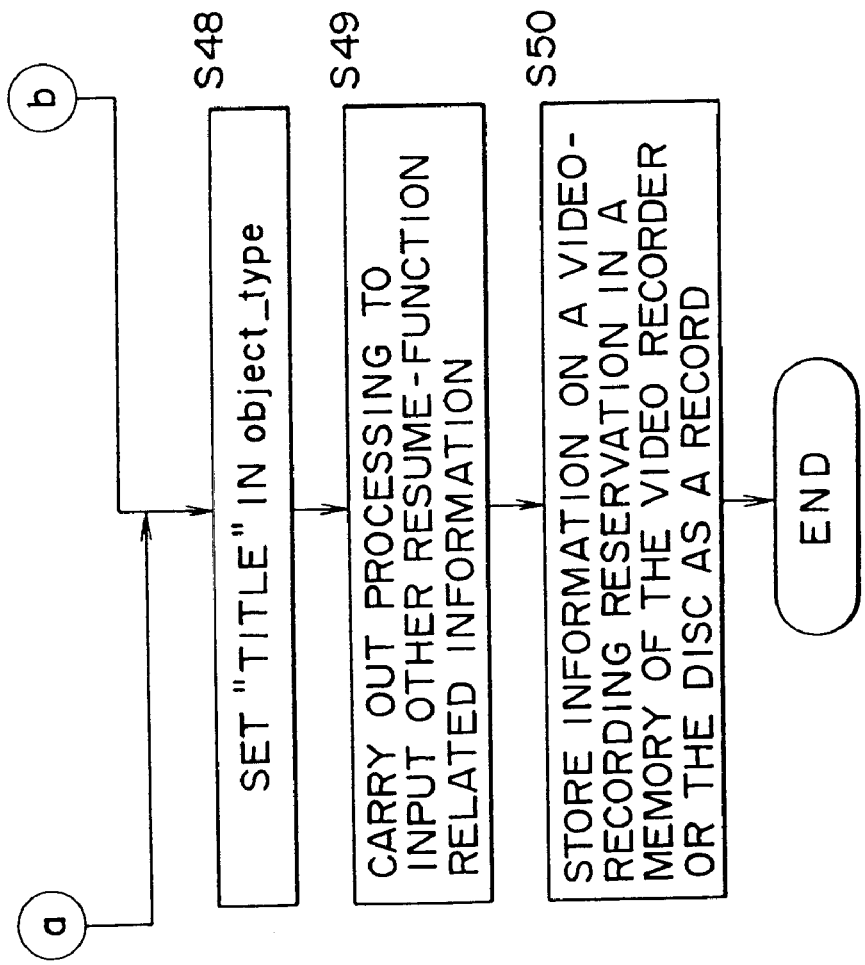

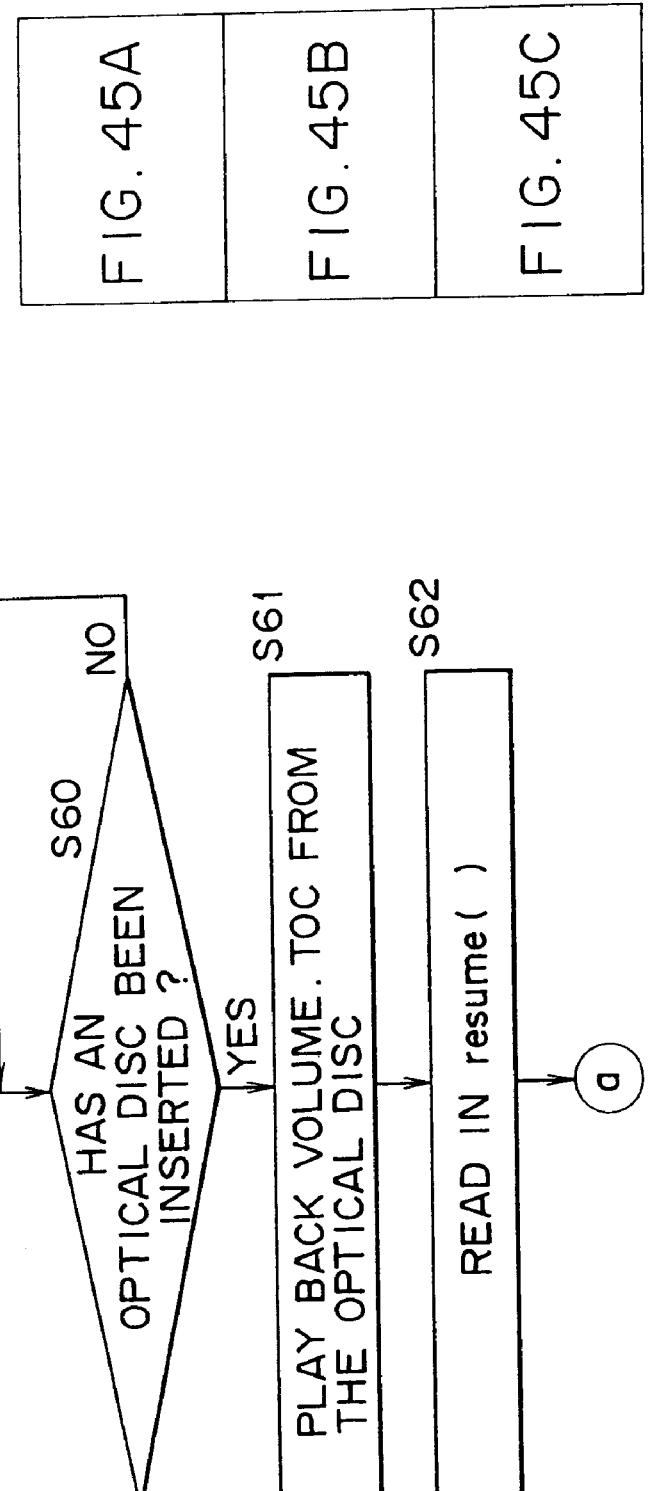

RECORDING AND REPRODUCING SYSTEM HAVING RESUME FUNCTION

Continuation of prior application Ser. No. 09/174,698, filed Oct. 19, 1998.

BACKGROUND OF THE INVENTION

In general, the present invention relates to a recording apparatus, a recording method, a playback apparatus, a playback method, a recording/playback apparatus, a recording/playback method, a presentation medium and a recording medium. More particularly, the present invention relates to a recording apparatus, a recording method, a playback apparatus, a playback method, a recording/playback apparatus, a recording/playback method, a presentation medium and a recording medium that make it possible to again make an access to a location on a disc which was accessed immediately before the disc was ejected.

In recent years, as a recording medium for recording data such as video information, a disc is drawing much attention, replacing a magnetic tape. Having a lack of random accessibility, a magnetic tape is suitable for use as a recording medium for simply recording and playing back video information continuously.

On the other hand, since a disc allows random accesses, video information can be played back from any arbitrary locations on the disc in any arbitrary order even if the video information was recorded on the disc continuously.

When a magnetic tape is ejected from a recording/playback apparatus, the magnetic tape can be put at the same position as the position the magnetic tape is ejected with ease. Thus, when the magnetic tape is remounted on the recording/playback apparatus, processing to record or play back information onto or from the magnetic tape can be started from the position immediately prior to the eject operation. In the case of an ejected disc, however, there is raised a problem that it is difficult to start processing to record or play back information onto or from the disc from a position immediately prior to an eject operation due to unfortunately to the random accessibility of the disc.

SUMMARY OF THE INVENTION

It is thus an object of the present invention addressing the problem described above to make accesses started from a position immediately prior to an eject operation.

In accordance with one aspect of the present invention, there is provided a recording apparatus for recording information on a recording medium is characterized in that the apparatus including:

a recording means for making an access to a predetermined location on the recording medium and recording information on the location;

a commanding means for making a request for ejection of the recording medium from the recording apparatus;

a storage means for storing resume-function related information including at least a location on the recording medium accessed by the recording means immediately prior to the ejection of the recording medium requested by the commanding means;

a transfer control means for controlling an operation to transfer the resume-function related information stored in the storage means to the recording medium prior to the ejection of the recording medium; and an ejecting means for ejecting the recording medium from the recording apparatus upon completion of the operation to transfer the resume-function related information stored in the storage means to the recording medium.

In accordance with another aspect of the present invention, there is provided a recording method adopted in a recording apparatus for recording information on a recording medium is characterized in that the method including:

a recording step of making an access to a predetermined location on the recording medium and recording information on the location;

a commanding step of making a request for ejection of the recording medium from the recording apparatus;

a storage step of storing resume-function related information including at least a location on the recording medium accessed at the recording step immediately prior to the ejection of the recording medium requested at the commanding step;

a transfer control step of controlling an operation to transfer the resume-function related information stored at the storage step to the recording medium prior to the ejection of the recording medium; and an ejecting step of ejecting the recording medium from the recording apparatus upon completion of the operation to transfer the resume-function related information to the recording medium.

In accordance with further aspect of the present invention, there is provided a presentation medium is characterized in that the presentation medium is used for presenting a program executable by a computer to drive a recording apparatus for recording information on a recording medium to carry out processing including:

a recording step of making an access to a predetermined location on the recording medium and recording information on the location;

a commanding step of making a request for ejection of the recording medium from the recording apparatus;

a storage step of storing resume-function related information including at least a location on the recording medium accessed at the recording step immediately prior to the ejection of the recording medium requested at the commanding step;

a transfer control step of controlling an operation to transfer the resume-function related information stored at the storage step to the recording medium prior to the ejection of the recording medium; and an ejecting step of ejecting the recording medium from the recording apparatus upon completion of the operation to transfer the resume-function related information to the recording medium.

In accordance with still further aspect of the present invention, there is provided a playback apparatus for playing back information from a recording medium is characterized in that the apparatus including:

a playback means for making an access to a predetermined location on the recording medium and playing back information recorded on the recording medium from the location;

a reading means for reading out resume-function related information from the recording medium upon insertion of the recording medium into the playback apparatus; and a location control means for controlling a location on the recording medium to be accessed by the playback means in accordance with what is read out by the reading means from the recording medium.

In accordance with yet further aspect of the present invention, there is provided a playback method adopted in a playback apparatus for playing back information from a recording medium is characterized in that the method including:

a playback step of making an access to a predetermined location on the recording medium and playing back information recorded on the recording medium from the location;

a reading step of reading out resume-function related information from the recording medium upon insertion of the recording medium into the playback apparatus; and a location control step of controlling a location on the recording medium to be accessed at the playback step in accordance with what is read out from the recording medium at the reading step.

In accordance with yet aspect of the present invention, there is provided a presentation medium is characterized in that the presentation medium is used for presenting a program executable by a computer to drive a playback apparatus for playing back information from a recording medium to carry out processing including:

a playback step of making an access to a predetermined location on the recording medium and playing back information recorded on the recording medium from the location;

a reading step of reading out resume-function related information from the recording medium upon insertion of the recording medium into the playback apparatus; and a location control step of controlling a location on the recording medium to be accessed at the playback step in accordance with what is read out from the recording medium at the reading step.

In accordance with yet aspect of the present invention, there is provided a recording/playback apparatus for recording and playing back information onto and from a recording medium is characterized in that the apparatus including:

a recording/playback means for making an access to a predetermined location on the recording medium and recording or playing back information onto or from the location;

a commanding means for making a request for ejection of the recording medium from the recording/playback apparatus;

a storage means for storing resume-function related information including at least a location on the recording medium accessed by the recording/playback means immediately prior to the ejection of the recording medium requested by the commanding means;

a transfer control means for controlling an operation to transfer the resume-function related information stored in the storage means to the recording medium prior to the ejection of the recording medium;

an ejecting means for ejecting the recording medium from the recording/playback apparatus upon completion of the operation to transfer the resume-function related information stored in the storage means to the recording medium;

a reading means for reading out resume-function related information from the recording medium upon insertion of the recording medium into the recording/playback apparatus; and a location control means for controlling a location on the recording medium to be accessed by the recording/playback means in accordance with what is read out by the reading means from the recording medium.

In accordance with yet aspect of the present invention, there is provided a recording/playback method adopted in a recording/playback apparatus for recording and playing back information onto and from a recording medium is characterized in that the method including:

a recording/playback step of making an access to a predetermined location on the recording medium and recording or playing back information onto or from the location;

a commanding step of making a request for ejection of the recording medium from the recording/playback apparatus;

a storage step of storing resume-function related information including at least a location on the recording medium accessed at the recording/playback step immediately prior to the ejection of the recording medium requested at the commanding step;

a transfer control step of controlling an operation to transfer the resume-function related information stored at the storage step to the recording medium prior to the ejection of the recording medium;

an ejecting step of ejecting the recording medium from the recording/playback apparatus upon completion of the operation to transfer the resume-function related information to the recording medium;

a reading step of reading out the resume-function related information from the recording medium upon insertion of the recording medium into the recording/playback apparatus; and a location control step of controlling a location on the recording medium to be accessed at the recording/playback step in accordance with what is read out at the reading step from the recording medium.

In accordance with yet aspect of the present invention, there is provided a presentation medium is characterized in that the presentation medium is used for presenting a program executable by a computer to drive a playback/recording apparatus for playing back information from a recording medium to carry out processing including:

a recording/playback step of making an access to a predetermined location on the recording medium and recording or playing back information onto or from the location;

a commanding step of making a request for ejection of the recording medium from the recording/playback apparatus;

a storage step of storing resume-function related information including at least a location on the recording medium accessed at the recording/playback step immediately prior to the ejection of the recording medium requested at the commanding step;

a transfer control step of controlling an operation to transfer the resume-function related information stored at the storage step to the recording medium prior to the ejection of the recording medium;

an ejecting step of ejecting the recording medium from the recording/playback apparatus upon completion of the operation to transfer the resume-function related information to the recording medium;

a reading step of reading out the resume-function related information from the recording medium upon insertion of the recording medium into the recording/playback apparatus; and a location control step of controlling a location on the recording medium to be accessed at the recording/ playback step in accordance with what is read out at the reading step from the recording medium.

In the recording apparatus, the recording method and the presentation medium according to the present invention, resume-function related information including at least a location on a recording medium accessed immediately prior to ejection of the recording medium from the recording apparatus as requested by an eject command is recorded into the recording medium.

In the playback apparatus, the playback method and the presentation medium according to the present invention, resume-function related information is read out from a recording medium when the recording medium is inserted into the playback apparatus and a location on the recording medium to be accessed is determined in accordance with the resume-function related information read out from the recording medium.

In the recording/playback apparatus, the recording/playback method and the presentation medium according to the present invention, resume-function related information including at least a location on a recording medium accessed immediately prior to ejection of the recording medium from the recording/playback apparatus as requested by an eject command is recorded into the recording medium. In addition, the resume-function related information is read out back from the recording medium when the recording medium is inserted into the recording/playback apparatus and a location on the recording medium to be accessed is determined in accordance with the resume-function related information read out from the recording medium.

BRIEF DESCRIPTION OF THE DRAWINGS

FIG. 2 is an explanatory diagram used for describing the structure of a VOLUME.TOC file;

FIG. 3 is an explanatory diagram used for describing the structure of volume_information ( );

FIG. 4 is an explanatory diagram used for describing the structure of volume_attribute ( );

FIG. 5 is an explanatory diagram used for describing the structure of resume ( );

FIG. 6 is an explanatory diagram used for describing the structure of volume_rating ( );

FIG. 7 is an explanatory diagram used for describing the structure of write_protect ( );

FIG. 8 is an explanatory diagram used for describing the structure of play_protect ( );

FIG. 9 is an explanatory diagram used for describing the structure of recording_timer ( );

FIG. 10 is an explanatory diagram used for describing the structure of text_block ( );

FIG. 11 is an explanatory diagram used for describing the structure of language_set ( );

FIG. 12 is an explanatory diagram used for describing the structure of text_item ( );

FIG. 13 is an explanatory diagram used for describing the structure of ALBUM.STR;

FIG. 14 is an explanatory diagram used for describing the structure of album ( );

FIG. 15 is an explanatory diagram used for describing the structure of TITLE_###.VDR;

FIG. 16 is an explanatory diagram used for describing the structure of title_info ( );

FIG. 17 is an explanatory diagram used for describing the structure of PROGRAM_$$$.PGI;

FIG. 18 is an explanatory diagram used for describing the structure of program ( );

FIG. 19 is an explanatory diagram used for describing the structure of play_list ( );

FIG. 20 is an explanatory diagram used for describing the structure of play_item ( );

FIG. 21 is an explanatory diagram used for describing the structure of CHUNKGROUP_###.CGIT;

FIG. 22 is an explanatory diagram used for describing the structure of chunk_connection_info ( );

FIG. 23 is an explanatory diagram used for describing the structure of chunk_arrangement_info ( );

FIG. 24 is an explanatory diagram used for describing the structure of CHUNK_%%%.ABST;

FIG. 26 is an explanatory diagram used for describing an organization of directories;

FIG. 29 is an explanatory diagram used for describing an organization of directories;

FIG. 30 is an explanatory diagram used for describing an organization of directories;

FIG. 32 is an explanatory diagram used for describing an organization of directories;

FIG. 33 is an explanatory diagram used for describing an organization of directories;

FIG. 36 is an explanatory diagram used for describing resume switch;

FIG. 37 is an explanatory diagram used for describing resume_auto_execute_time_flag;

FIG. 38 is an explanatory diagram used for describing resume_mode_flag;

FIG. 39 is an explanatory diagram used for describing object_type;

FIG. 40 is a flowchart used for explaining processing to record resume-function related information;

FIG. 42 is a continuation of the flowchart used for explaining processing to execute a resume playback function shown in FIG. 41;

FIG. 43 is an explanatory diagram used for describing resume ( ) extended to include information on a video-recording reservation;

FIG. 44 is a flowchart used for explaining processing to make a video-recording reservation.

DETAILED DESCRIPTION OF THE PREFERRED EMBODIMENTS

Before embodiments of the present invention are described, each means cited in claims of the patent in the specification is exemplified by a typical implementation appended after the means by enclosing the implementation in parentheses in the following description of characteristics of the present invention in order to clarify a relation associating the means with the implementation. It is needless to say, however, that the appended implementation is not to intended to be construed in a limiting sense, that is, examples of the means are not limited to the appended implementation.

According to claim 1, a recording apparatus for recording information on a recording medium is characterized in that the apparatus comprises:

a recording means (implemented typically by an optical head 2 shown in FIG. 25) for making an access to a predetermined location on the recording medium and recording information on the location;

a commanding means (implemented typically by an input unit 14 shown in FIG. 25) for making a request for ejection of the recording medium from the recording apparatus;

a storage means (implemented typically by a step S5 of a flowchart shown in FIG. 40) for storing resume-function related information including at least a location on the recording medium accessed by the recording means immediately prior to the ejection of the recording medium requested by the commanding means;

a transfer control means (implemented typically by a step S11 of the flowchart shown in FIG. 40) for controlling an operation to transfer the resume-function related information stored in the storage means to the recording medium prior to the ejection of the recording medium; and an ejecting means (implemented typically by a step S12 of the flowchart shown in FIG. 40) for ejecting the recording medium from the recording apparatus upon completion of the operation to transfer the resume-function related information stored in the storage means to the recording medium.

According to claim 4, a recording apparatus as in claim 1 is further characterized in that the recording apparatus further has an adding means (implemented typically by a step S9 of the flowchart shown in FIG. 40) for adding information on validity indicating whether the resume-function related information is valid or invalid to the resume-function related information.

Figure 41B:
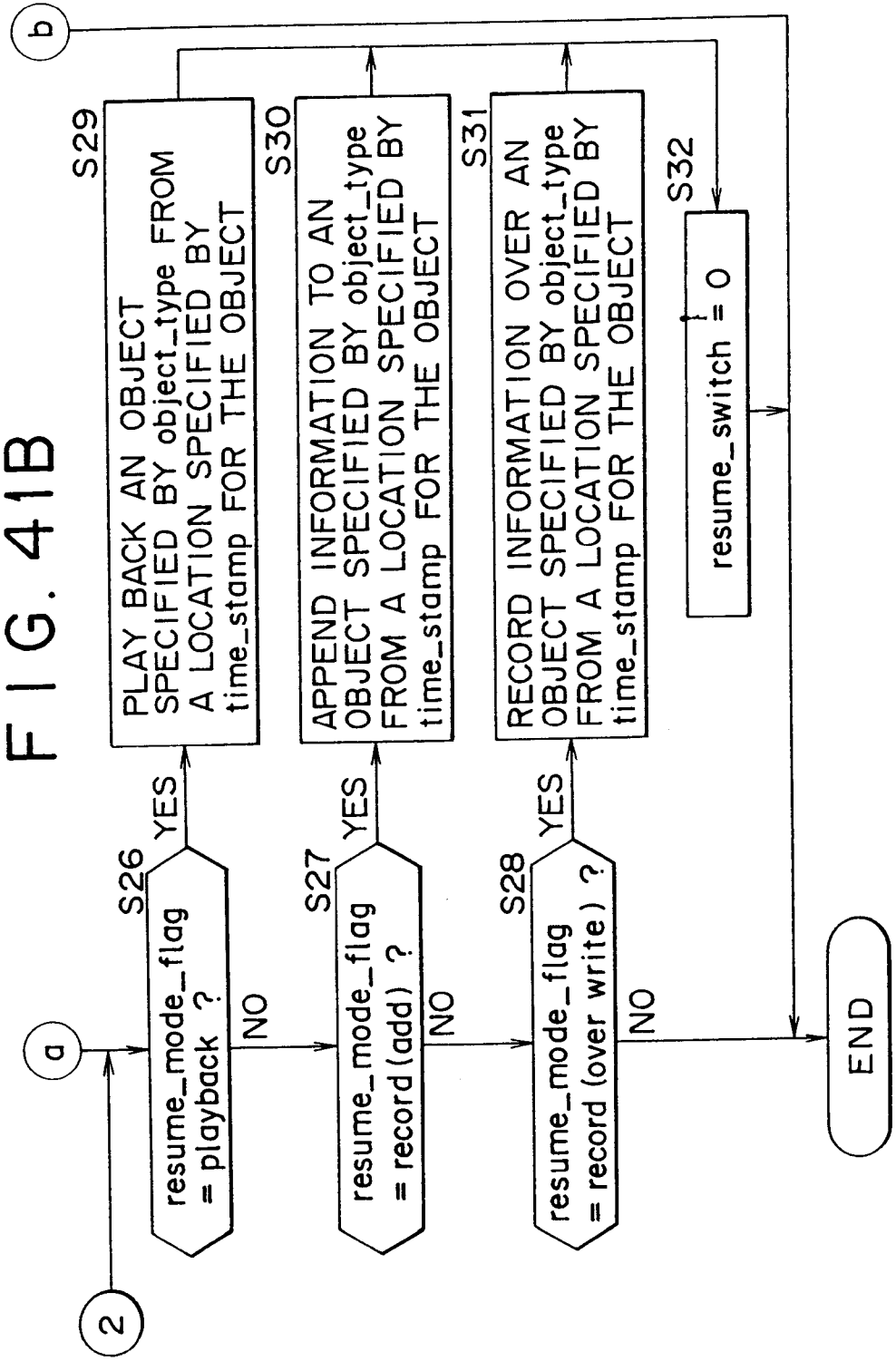
FIG. 41 is a flowchart used for explaining processing to execute a resume playback function.

According to claim 8, a playback apparatus for playing back information from a recording medium is characterized in that the apparatus comprises:

a playback means (implemented typically by the optical head 2 shown in FIG. 25) for making an access to a predetermined location on the recording medium and playing back information recorded on the recording medium from the location;

a reading means (implemented typically by a step S23 of a flowchart shown in FIG. 41) for reading out resume-function related information from the recording medium upon insertion of the recording medium into the playback apparatus; and a location control means (implemented typically by a step S29 of the flowchart shown in FIG. 41) for controlling a location on the recording medium to be accessed by the playback means in accordance with what is read out by the reading means from the recording medium.

According to claim 15, a recording/playback apparatus for recording and playing back information onto and from a recording medium is characterized in that the apparatus comprises:

a recording/playback means (implemented typically by the optical head 2 shown in FIG. 25) for making an access to a predetermined location on the recording medium and recording or playing back information onto or from the location;

a commanding means (implemented typically by the input unit 14 shown in FIG. 25) for making a request for ejection of the recording medium from the recording/playback apparatus;

a storage means (implemented typically by the step S5 of the flowchart shown in FIG. 40) for storing resume-function related information including at least a location on the recording medium accessed by the recording/playback means immediately prior to the ejection of the recording medium requested by the commanding means;

a transfer control means (implemented typically by the step S11 of the flowchart shown in FIG. 40) for controlling an operation to transfer the resume-function related information stored in the storage means to the recording medium prior to the ejection of the recording medium;

an ejecting means (implemented typically by the step S12 of the flowchart shown in FIG. 40) for ejecting the recording medium from the recording/playback apparatus upon completion of the operation to transfer the resume-function related information stored in the storage means to the recording medium;

a reading means (implemented typically by the step S23 of the flowchart shown in FIG. 41) for reading out resume-function related information from the recording medium upon insertion of the recording medium into the recording/playback apparatus; and a location control means (implemented typically by the step S29 of the flowchart shown in FIG. 41) for controlling a location on the recording medium to be accessed by the recording/playback means in accordance with what is read out by the reading means from the recording medium.

Figure 1:
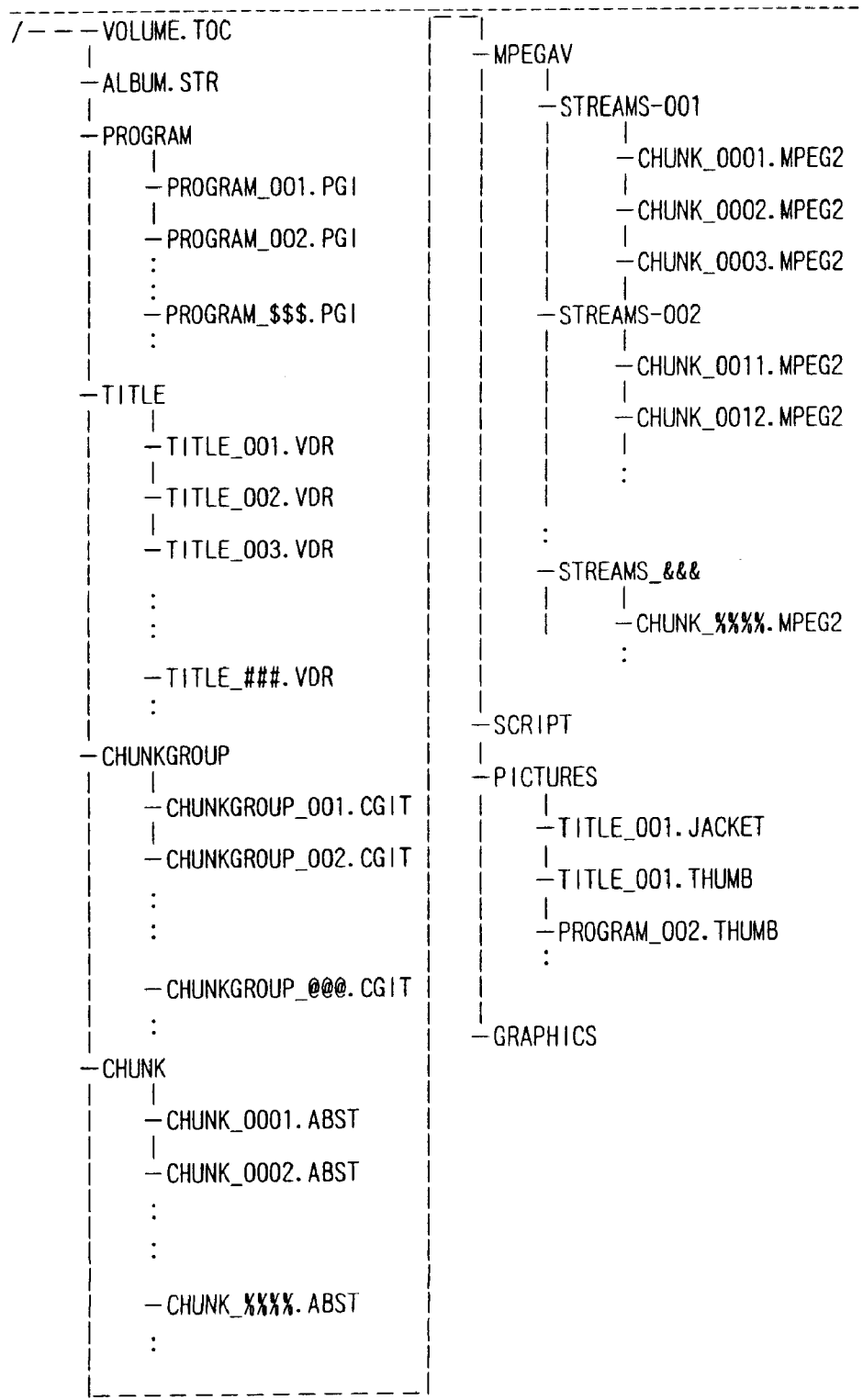
FIG. 1 is an explanatory diagram used for describing an organization of directories.

The description begins with an explanation of a layout of files on a recording medium provided by the present invention, which information is recorded into and played back from. Recorded on the recording medium, files shown in FIG. 1 are classified into 7 types listed below.

VOLUME.TOC
    ALBUM.STR
    PROGRAM_$$$.PGI
    TITLE_###.VDR
    CHUNKGROUP _@@@.CGIT
    CHUNK_%%%%.ABST
    CHUNK_%%%%.MPEG2

The VOLUME.TOC and ALBUM.STR files are placed in a root directory. A directory named "PROGRAM" is placed immediately below the root directory. The PROGRAM directory includes PROGRAM_$$$.PGI files where notation $$$ represents the number of a program. By the same token, a directory named TITLE is placed immediately below the root directory. The TITLE directory includes TITLE_###.VDR files where notation ### represent the number of a title. Placed immediately below the root directory, a CHUNKGROUP directory includes CHUNKGROUP_@@@.CGIT files where notation @@@ represents the number of a chunk group and a CHUNK directory includes CHUNK_%%%%.ABST files where notation %%%% represents the number of a chunk.

Also placed immediately below the root directory, an MPEGAV directory contains a plurality of sub-directories which each include CHUNK_%%%%.MPEG2 files where %%%% represents the number of a chunk.

Normally, one VOLUME.TOC file exists in the recording medium. In a recording medium with a special structure such as a recording medium with a ROM and RAM hybrid structure, however, a plurality of VOLUME.TOC files may exist. This VOLUME.TOC file is used for showing the property of the recording medium as a whole.

FIG. 2 is a diagram showing the structure of the VOLUME.TOC file. As shown in the figure, file_type_id is placed at the head of the file to indicate that the file is a VOLUME.TOC file. file_type_id is followed by volume_information ( ) which is finally followed by text_block ( ).

FIG. 3 is a diagram showing the structure of volume_information ( ). As shown in the figure, volume_information ( ) comprises volume_attribute ( ), resume ( ), volume_rating ( ), write_protect ( ), play_protect ( ) and recording_timer ( ).

volume_attribute ( ) is an area used for recording attributes of the logical volume. FIG. 4 is a diagram showing a detailed structure of volume_attribute ( ). As shown in the figure, volume_attribute ( ) includes title_playback_mode_flag and program_playback_mode_flag.

resume ( ) is an area used for recording information used in restoration of a state immediately prior to an eject operation at the time the recording medium is reinserted. FIG. 5 is a diagram showing a detailed structure of resume ( ).

volume_rating ( ) shown in FIG. 3 is an area used for recording information used in implementation of age limitation of watchers/listeners of the volume as a whole in accordance with user ages and user categories. FIG. 6 is a diagram showing a detailed structure of volume_rating ( ).

write_protect ( ) shown in FIG. 3 is an area used for recording information used in limitation of operations to change and delete a title or a program. FIG. 7 is a diagram showing a detailed structure of write_protect ( )

play_protect ( ) shown in FIG. 3 is an area used for recording information setting a playback enable function or a playback disable function and limiting the number of playback operations for a title or a program recorded in the volume. FIG. 8 is a diagram showing a detailed structure of play_protect ( ).

recording_timer ( ) shown in FIG. 3 is an area used for recording information controlling a recording time. FIG. 9 is a diagram showing a detailed structure of recording_timer ( ).

FIG. 10 is a diagram showing a detailed structure of text_block ( ) of the VOLUME.TOC file shown in FIG. 2. As shown in FIG. 10, text_block ( ) includes language_sets ( ) and text_items ( ). FIGS. 11 and 12 show detailed structures of language_set ( ) and text_item respectively.

Normally, one ALBUM.STR file shown in FIG. 1 exists in a recording medium. In a recording medium with a special structure such as a recording medium with a ROM and RAM hybrid structure, however, a plurality of ALBUM.STR files may exist. The ALBUM.STR file is used for combining a plurality of recording media into a configuration that makes the recording media appear as if there were only a single recording medium.

FIG. 13 is a diagram showing the structure of the ALBUM.STR file. As shown in the figure, file_type_id is placed at the head of the file to indicate that the file is ALBUM.STR. file_type_id is followed by album ( ) which is finally followed by text_block ( ).

album ( ) is an area used for recording information used in handling a plurality of volumes, that is, a plurality of recording media, as one integrated volume. FIG. 14 is a diagram showing a detailed structure of album ( ).

As many TITLE_###.VDR files shown in FIG. 1 as titles exist. A title refers to, for example, a musical selection in the case of a compact disc or a program in the case of a television broadcasting. FIG. 15 is a diagram showing the structure of a TITLE_###.VDR file. As shown in the figure, file_type_id is placed at the head of the file to indicate that the file is TITLE_###.VDR. file_type_id is followed by title_info ( ) which is finally followed by text_block ( ). Notation ### is a string of characters representing the number of a title.

title_info ( ) is an area used for recording a start point and an end point of the title on a chunk group and other attributes of the title. FIG. 16 is a diagram showing a detailed structure of title_info ( ).

As many PROGRAM_$$$.PGI files shown in FIG. 1 as programs exist. A program comprises a plurality of cuts each specifying an area of a portion or all of a title. Cuts of a program are played back in a specified order. FIG. 17 is a diagram showing the structure of a PROGRAM_$$$.PGI file. As shown in the figure, file_type_id is placed at the head of the file to indicate that the file is PROGRAM_$$$.PGI. file_type_id is followed by program ( ) which is finally followed by text_block ( ). Notation $$$ is a string of characters representing the number of a program.

program ( ) is an area used for recording information required in an operation to collect necessary portions of titles and play back them without accomplishing irreversible editing of materials. FIG. 18 is a diagram showing a detailed structure of program ( ).

program ( ) shown in FIG. 18 has one play_list. FIG. 19 is a diagram showing details of play_list ( ).

A plurality of play_items ( ) are placed in play_list. FIG. 20 is a diagram showing details of play_item ( ).

As many CHUNKGROUP_@@@.CGIT files shown in FIG. 1 as many chunk groups exist. A chunk group is a data structure used for arranging a bit stream. When the user normally operates an apparatus for recording and playing back information into and from a recording medium such as a VDR (Video Disc Recorder), the user is not aware of the existence of this file.

FIG. 21 is a diagram showing a CHUNKGROUP_@@@.CGIT file. As shown in the figure, file_type_id is placed at the head of the file to indicate that the file is CHUNKGROUP_@@@.CGIT. file_type_id is followed by chunkgroup_time_base_flags and chunkgroup_time_base_offset which are followed by chunk_connection_info ( ). Finally, chunk_connection_info ( ) is followed by text_block ( ).

chunkgroup_time_base_flags are flags each associated with a reference counter of a chunk group. chunkgroup_time_base_offset shows a start time of a reference time axis of a chunk group. chunkgroup_time_base_offset is a 32-bit value set in a counter which counts up at a frequency of 90 kHz. chunk_connection_info ( ) is an area used for recording peculiar information such as a video switch-over point, and video and audio synchronization. FIG. 22 is a diagram showing a detailed structure of chunk_connection_info ( ).

chunk_connection_info ( ) includes as many loops of chunk_arrangement_info ( ) as chunks pertaining to a chunk group. FIG. 23 is a diagram showing details of chunk_arrangement_info ( ).

As many CHUNK_%%%%.ABST files shown in FIG. 1 as many chunks exist. A chunk is information file for a stream file. FIG. 24 is a diagram showing the structure of a CHUNK_%%%%.ABST file. As shown in the figure, file_type_id is placed at the head of the file to indicate that the file is CHUNK_%%%%.ABST.

The CHUNK_%%%%.MPEG2 file shown in FIG. 1 is a stream file. Unlike other files which are generally used for storing information only, this file is used for storing an MPEG bit stream.

Figure 25A:
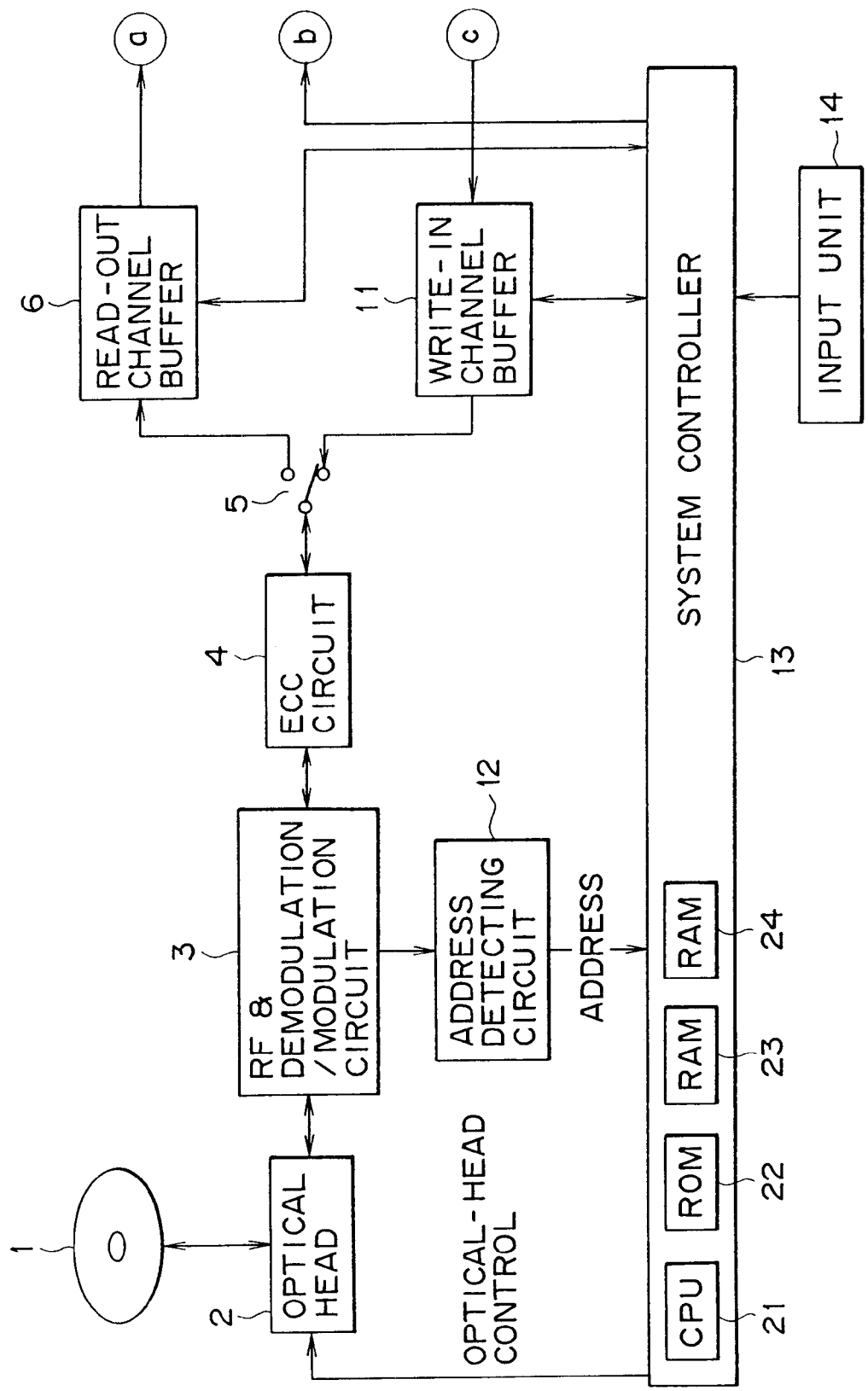
FIG. 25 is a block diagram showing a typical configuration of an optical-disc apparatus to which the present invention is applied.

FIG. 25 is a diagram showing a typical configuration of an optical-disc apparatus for recording and playing back information into and from an optical disc used as a recording medium including the files described above. In the optical-disc apparatus, a single optical head 2 is provided for a rewritable optical disc 1. The optical head 2 is used for both reading out and writing information from and into the optical disc 1.

After being demodulated in an RF & demodulation/modulation circuit 3, a bit stream read out by the optical head 2 from the optical disc 1 is subjected to error correction in an ECC circuit 4 before being supplied to a read-out channel buffer 6 for absorbing a difference between a read-out rate and a decode-processing rate by way of a switch 5. An output of the read-out channel buffer 6 is supplied to a decoder 7. The read-out channel buffer 6 is designed so that a system controller 13 is capable of reading and writing the read-out channel buffer 6.

A bit stream output by the read-out channel buffer 6 is decoded by the decoder 7 which outputs video and audio signals as results of decoding. The video signal output by the decoder 7 is supplied to a synthesis circuit 8 to be synthesized therein with a video signal generated by an OSD (On Screen Display) control circuit 9. A result of the synthesis is output through an output terminal P1 to a display unit be displayed on the display unit which is not shown in the figure. In the mean time, the audio signal generated by the decoder 7 is output to a speaker through an output terminal P2 to be played back in the speaker which is also not shown in the figure.

On the other hand, a video signal input from an input terminal P3 and an audio signal input from an input terminal P4 are encoded by an encoder 10 before being supplied to a write-in channel buffer 11 for absorbing a difference between an encode-processing rate and a write-in rate. The write-in channel buffer 11 is also designed so that the system controller 13 is capable of reading and writing the write-in channel buffer 11.

Data stored in the write-in channel buffer 11 is read out from the write-in channel buffer 11 and supplied to the ECC circuit 4 by way of the switch 5. In the ECC circuit 4, an error correction code is added to the data before the data is supplied to the RF & demodulation/modulation circuit 3 to be modulated thereby. A signal, strictly speaking, an RF signal, output by the RF & demodulation/modulation circuit 3 is recorded onto the optical disc 1 by the optical head 2.

An address detecting circuit 12 detects information on an address on a track on an optical disc 1 subjected to a recording or playback operation. The system controller 13 controls operations of components composing the optical-disc apparatus. The system controller 13 comprises a CPU 21 for executing various kinds of control, a ROM unit 22 for storing information such as processing programs to be executed by the CPU 21, a RAM unit 23 for temporarily storing information such as data obtained as a result in the course of processing carried out by the CPU 21 and a RAM unit 24 for storing a variety of information files to be recorded or played back into or from the optical disc 1. The CPU 21 finely adjusts the position of the optical head 2 on the basis of a result of detection output by the address detecting circuit 12. The CPU 21 also controls switching-over operations of the switch 5. Composed of a variety of switches and a variety of buttons, an input unit 14 is operated by the user for entering a variety of commands to the optical-disc apparatus.

Next, a basic operation to read in data from an information file is explained. In an operation to read in data from the VOLUME.TOC information file, for example, the CPU 21 employed in the system controller 13 first confirms the physical address at which the VOLUME.TOC file is recorded in the optical disc 1 and the length of the file by using a file-system operation instruction included in a processing program in advance. Then, the CPU 21 moves the optical head 2 to a read-out position on the basis of information on the address of the VOLUME.TOC file. Subsequently, the CPU 21 sets the optical head 2, the RF & demodulation/modulation circuit 3 and the ECC circuit 4 in a read-out mode and positions the switch 5 on the side of the read-out channel buffer 6. Furthermore, the CPU 21 finely adjusts the position of the optical head 2 before starting a read-out operation by using the optical head 2. In the read-out operation, contents of the VOLUME.TOC file are read out by the optical head 2 and demodulated by the RF & demodulation/modulation circuit 3. The output of the RF & demodulation/modulation circuit 3 is subjected to error correction in the ECC 4 before being stored in the read-out channel buffer 6.

When the amount of data stored in the read-out channel buffer 6 becomes equal to or exceeds the size of the VOLUME.TOC file, the CPU 21 halts the read-out operation. Later on, the CPU 21 reads out the data stored in the read-out channel buffer 6 and stores the data in the RAM unit 24.

Next, a basic operation to write data into an information file is explained by taking the VOLUME.TOC information file as an example. First of all, the CPU 21 searches the file system, that is, the optical disc 1, for a free area having a size equal to or larger than a VOLUME.TOC file, into which data is to be written, and confirms the address of the free area by using a file-system operation instruction included in a processing program in advance.

Then, the CPU 21 transfers the VOLUME.TOC file prepared in the RAM unit 24 and to be newly written into the optical disc 1 to the write-in channel buffer 11. The CPU 21 then moves the optical head 2 to a write-in position on the basis of information on the address of the VOL UME.TOC file. Subsequently, the CPU 21 sets the optical head 2, the RF & demodulation/modulation circuit 3 and the ECC circuit 4 in a write-in mode and positions the switch 5 on the side of the write-in channel buffer 11. Furthermore, the CPU 21 finely adjusts the position of the optical head 2 before starting a write-in operation by using the optical head 2.

In the write-in operation, the newly prepared contents of the VOLUME.TOC file are read out from the write-in channel buffer 11 and supplied to the ECC circuit 4 by way of the switch 5. In the ECC circuit 4, an error correction code is added to the contents before modulation by the RF & demodulation/modulation circuit 3. A signal output by the RF & demodulation/modulation circuit 3 is recorded into the optical disc 1 by the optical head 2. When the amount of data read out from the write-in channel buffer 11 and recorded into the optical disc 1 becomes equal to or exceeds the size of the VOLUME.TOC file, the CPU 21 halts the write-in operation.

Finally, the CPU 21 rewrites a pointer pointing to the VOLUME.TOC file on the file system, that is, the optical disc 1, so as to make the pointer point to the newly written position by using a file-system operation instruction included in the processing program in advance.

Next, a basic operation to play back a stream is explained by taking a CHUNK_0001.MPEG2 file shown in FIG. 1 as an example. First of all, the CPU 21 employed in the system controller 13 confirms the physical address at which the CHUNK_0001.MPEG2 file is recorded in the optical disc 21 and the length of the file by using a file-system operation instruction included in a processing program in advance. Then, the CPU 21 moves the optical head 2 to a read-out position on the basis of information on the address of the CHUNK_0001.MPEG2 file. Subsequently, the CPU 21 sets the optical head 2, the RF & demodulation/modulation circuit 3 and the ECC circuit 4 in a read-out mode and positions the switch 5 on the side of the read-out channel buffer 6. Furthermore, the CPU 21 finely adjusts the position of the optical head 2 before starting a read-out operation by using the optical head 2.

In the read-out operation, contents of the CHUNK_0001.MPEG2 file read out by the optical head 2 are stored in the read-out channel buffer 6 through the RF & demodulation/modulation circuit 3, the ECC circuit 4 and the switch 5. The data stored in the read-out channel buffer 6 is output to the decoder 7 to be decoded by the decoder 7 which outputs video and audio signals as results of decoding. The audio signal generated by the decoder 7 is output to the output terminal P2. In the mean time, the video signal output by the decoder 7 is supplied to the output terminal P1 through the synthesis circuit 8.

When the amount of data read out from the optical disc 1 and decoded by the decoder 7 to be finally displayed becomes equal to the size of the CHUNK_0001.MPEG2 or when an instruction to halt the read-out operation is received from the input unit 14, the CPU 21 stops the read-out and decode processing.

Next, a basic operation to record a stream into an information file is explained by taking the CHUNK_0001.MPEG2 information file as an example. First of all, the CPU 21 searches the file system, that is, the optical disc 1, for a free area having a size equal to or larger than the CHUNK_0001.MPEG2 file, into which a stream is to be written, and confirms the address of the free area by using a file-system operation instruction included in a processing program in advance.

A video signal input from the input terminal P3 and an audio signal input from the input terminal P4 are encoded by an encoder 10 before being supplied to the write-in channel buffer 11. The CPU 21 then moves the optical head 2 to a write-in position on the basis of information on the address of the CHUNK_0001.MPEG2 file. Subsequently, the CPU 21 sets the optical head 2, the RF & demodulation/modulation circuit 3 and the ECC circuit 4 in a write-in mode and positions the switch 5 on the side of the write-in channel buffer 11. Furthermore, the CPU 21 finely adjusts the position of the optical head 2 before starting a write-in operation by using the optical head 2. In the write-in operation, the newly prepared contents of the CHUNK_0001.MPEG2 file are read out from the write-in channel buffer 11 and supplied to optical head 2 by way of the switch 5, the ECC circuit 4 and the RF & demodulation/modulation circuit 3. A signal output by the RF & demodulation/modulation circuit 3 is recorded into the optical disc 1 by the optical head 2.

When the amount of data read out from the write-in channel buffer 11 and recorded into the optical disc 1 becomes equal to the size of the CHUNK_0001.MPEG2 or when an instruction to halt the write-in operation is received from the input unit 14, the CPU 21 stops the write-in processing. Finally, the CPU 21 rewrites a pointer pointing to the CHUNK_0001.MPEG2 file on the file system, that is, the optical disc 1, so as to make the pointer point to the newly written position by using a file-system operation instruction included in the processing program in advance.

Assume that information and stream files shown in FIG. 26 have been recorded in the optical disc 1. In this example, the optical disc 1 includes a file named PROGRAM_001.PGI for storing a program. In addition, the optical disc 1 also includes three title files named TITLE_001.VDR, TITLE_002.VDR and TITLE_003.VDR respectively.

Furthermore, the optical disc 1 also includes two chunk-group information files named CHUNKGROUP_001.CGIT and CHUNKGROUP_002.CGIT. On the top of that, the optical disc 1 includes three stream files named CHUNK_0001.MPEG2, CHUNK_0011.MPEG2 and CHUNK_0012.MPEG2 as well as three information files named CHUNK_0001.ABST, CHUNK_0011.ABST and CHUNK_0012.ABST associated with the CHUNK_0001.MPEG2, CHUNK_0011.MPEG2 and CHUNK_0012.MPEG2 files respectively.

Figure 27:
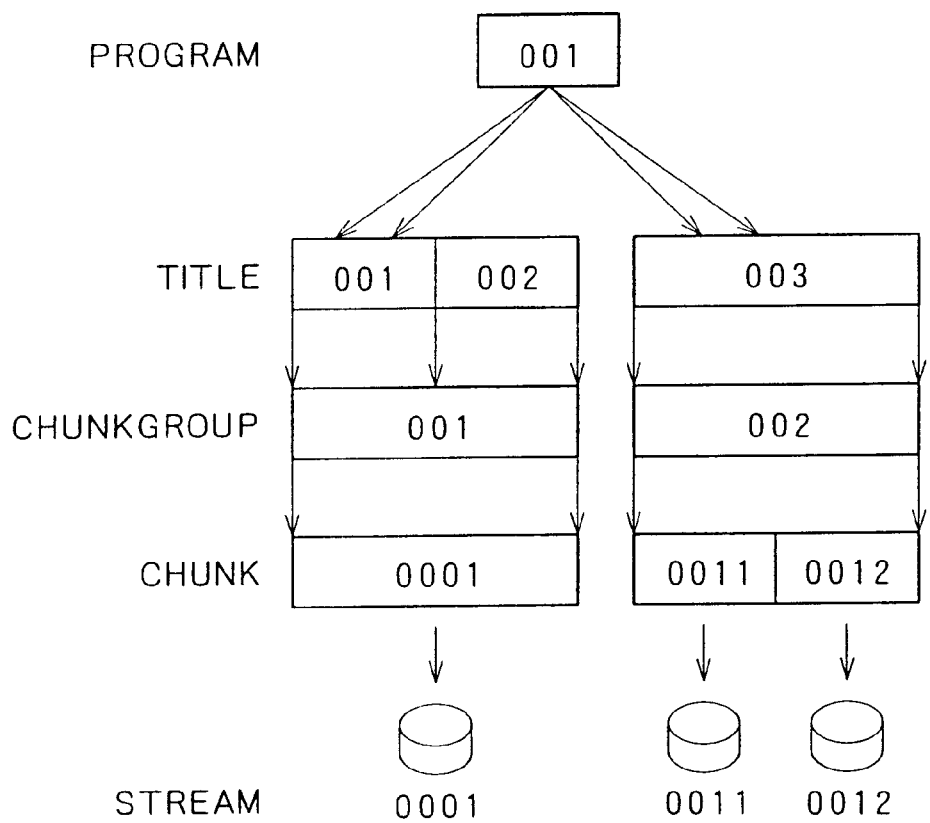
FIG. 27 is an explanatory diagram used for describing a logical organization of directories.

FIG. 27 is a diagram showing the logical structure of the optical disc 1 containing the information and stream files shown in FIG. 26. In this example, the chunk information files named CHUNK_0001.ABST, CHUNK_0011.ABST and CHUNK_0012.ABST specify the CHUNK_0001.MPEG2, CHUNK_0011.MPEG2 and CHUNK_0012.MPEG2 stream files respectively. To put it concretely, in a chunk_file_id field of each of the CHUNK_%%%%.ABST files shown in FIG. 24, the file ID of the associated stream file is specified.

In addition, in this example, the chunk-group information file named CHUNKGROUP_001.CGIT specifies the chunk information file named CHUNK_0001.ABST whereas the chunk-group information file named CHUNKGROUP_002.CGIT specifies the chunk information files named CHUNK_0011.ABST and CHUNK_0012.ABST. To put it concretely, in a chunk_info_file_id field of chunk_arrangement_info ( ) shown in FIG. 23, a file ID of chunk information is specified. This chunk_arrangement_info ( ) is included in a chunk group information file. As many chunk_arrangement_infos ( ) as chunks pertaining to a chunk group exist in the data structure. It should be noted that chunk_arrangement_info ( ) shown in FIG. 23 is described in chunk_connection_info ( ) shown in FIG. 22 and this chunk_connection_info is described in the CHUNKGROUP_###.CGIT file shown in FIG. 21.

There is only one chunk_arrangement_info ( ) in CHUNKGROUP_001. The chunk_info_file_id field of this chunk_arrangement_info ( ) specifies CHUNK_0001. On the other hand, there are two chunk_arrangement_infos ( ) in CHUNKGROUP_002. The chunk_info_file_id fields of these chunk_arrangement_infos ( ) specify CHUNK_0011 and CHUNK_0012 respectively. Thus, a chunk group can be used to specify an order in which a plurality of chunks are to be played back.

To put it concretely, first of all, an initial value of a timer for the chunk group is determined by chunkgroup_time_base_offset in the CHUNKGROUP_###.CGIT file shown in FIG. 21. Then, when each chunk is cataloged, presentation_start_cg_time_count and presentattion_end_cg_time_count of chunk_arrangement_info ( ) shown in FIG. 23 are specified.

Figure 28:
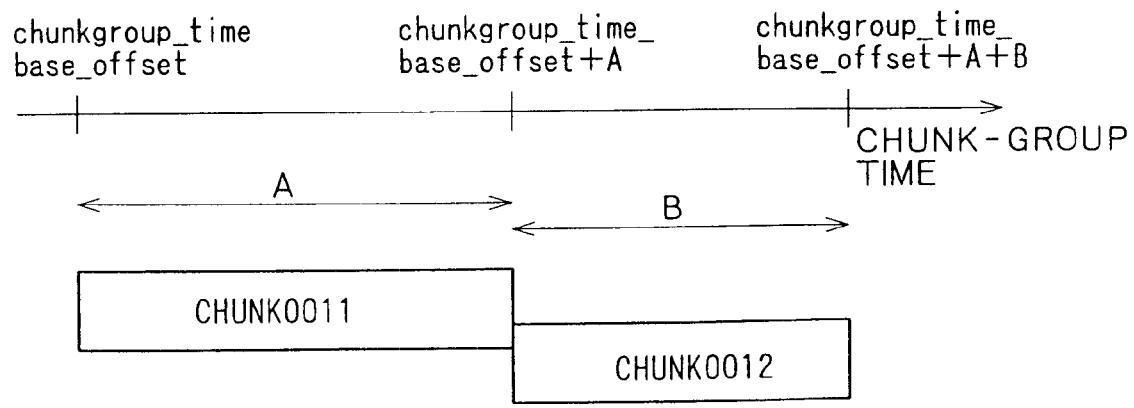
FIG. 28 is an explanatory diagram used for describing an offset.

For example, assume that the time lengths of CHUNK_0011 and CHUNK_0012 are A and B respectively as shown in FIG. 28. In this case, presentation_start_cg_count and presentattion_end_cg_count of CHUNK_0011 are equal to chunkgroup_time_base_offset and chunk_group_time_base_offset+A respectively. On the other hand, presentation_start_cg_count and presentattion_end_cg_count of CHUNK_0012 are equal to chunkgroup_time base_offset+A and chunk_group_time_base_offset+A+B respectively. By setting the fields in this way, CHUNKGROUP_002 is defined so that CHUNK_0011 and CHUNK_0012 are played back continuously.

It should be noted that, if the playback time of CHUNK_0011 overlaps the playback time of CHUNK_0012, one of the playback times can be shifted to eliminate the overlapping. In addition, transition_info ( ) in chunk_arrangement_info ( ) shown in FIG. 23 is used as a descriptive field used for specifying a special effect such as a fade-in, a fade-out or a wipe in a transition from one stream to another one.

In the example shown in FIG. 26 (or FIG. 27), the TITLE_001.VDR and TITLE_002.VDR title information files specify the CHUNKGROUP_001.CGIT chunk-group information file whereas the TITLE_003.VDR title information file specifies the CHUNKGROUP_002.CGIT chunk-group information file. To put it concretely, a cgit_file_id field in title_info ( ) shown in FIG. 16 specifies the file ID of the chunk group. In addition, fields named title_start_chunk_group_time_stamp and title_end_chunk_group_time_stamp are used for specifying a time range in which the title is defined in the chunk group.

In the example shown in FIG. 27, for example, TITLE_001 and TITLE_002 specify the first and second halves of CHUNKGROUP_001. It should be noted that the division conforms to a request made by the user and its position is determined arbitrarily by the user instead of being determined in advance. In this example, let the position of division into TITLE_001 and TITLE_002 be set at a location separated away from the head of CHUNKGROUP_001 by a distance of A.

TITLE_001 specifies CHUNKGROUP_001 as a chunk group and a start time of CHUNKGROUP_001 as a start time of the title. As an end time of the title, a time of a point specified by the user is specified.

That is to say, as title_start_chunk_group_time_stamp of TITLE_001, chunkgroup_time_base_offset (the position of the head) of CHUNKGROUP_001 is set whereas, as title_end_chunk_group_time_stamp of TITLE_001, a sum of chunkgroup_time_base_offset of CHUNKGROUP_001 and the distance A is set.

TITLE_002 specifies CHUNKGROUP_001 as a chunk group and a time of a point specified by the user is specified a start time of the title. As an end time of the title, an end time of CHUNKGROUP_001 is specified.

That is to say, as title_start_chunk_group_time_stamp of TITLE_002, a sum of chunkgroup_time_base_offset (the position of the head) of CHUNKGROUP_001 and the distance A is set whereas, as title_end_chunk_group_time_stamp of TITLE_002, a sum of chunkgroup_time_base_offset of CHUNKGROUP_001 and the length of CHUNKGROUP_001 is set.

TITLE_003 specifies CHUNKGROUP_002 as a chunk group and a start time of CHUNKGROUP_002 is specified a start time of the title. As an end time of the title, an end time of CHUNKGROUP_002 is specified.

That is to say, as title_start_chunk_group_time_stamp of TITLE_003, chunkgroup_time_base_offset (the position of the head) of CHUNKGROUP_002 is set whereas, as title_end_chunk_group_time_stamp of TITLE_003, a sum of chunkgroup_time_base_offset of CHUNKGROUP_002 and the length of CHUNKGROUP_002 is set.

In addition, in this example, the program information file named PROGRAM_001.PGI specifies that part of TITLE_001 and part of TITLE_003 be played back in an order the parts are enumerated. To put it concretely, title_number in play_item ( ) shown in FIG. 20 is used for specifying a title. Times defined by a title are used for defining start and end points to extract a cut. A plurality of such cuts are gathered to compose a program.

The following is a description of an append-record operation to additionally record new information onto the optical disc 1. To put it concretely, this append-record operation is typically carried out as a video recording operation or carried out by the user by operating the input unit 14 to enter a command to perform video real-time recording to the optical-disc apparatus. In the latter case, a recording button is pressed if the video-recording end time is not known. A button for a one-touch recording function is pressed, however, for a case in which the recording end time can be predicted. The one-touch recording function is a function for carrying out video recording for a fixed period of time.

The append-record operation is explained by taking timer recording as an example. In this case, the user of the optical-disc apparatus specifies, among other things, a recording start time, a recording end time, the bit rate of a bit stream and a channel to be recorded in advance. In addition, at a point of time the video recording is reserved, the optical disc 1 is checked in advance to find out whether or not there is left a free space suited for the bit rate and the length of the recording time.

If another recording operation is carried out on the optical disc 1 between a time a reservation is made and a time to execute the reserved video recording, it is quite within the bounds of possibility that the confirmed free space for implementing the reserved video recording at the specified bit rate can not be allocated any more. In such a case, the CPU 21 either reduces the bit rate to a value smaller than the specified fore in order to record information for the reserved period of time, or records information for a period of time as long as possible by keeping the bit rate unchanged as it is. It is needless to say that the CPU 21 then carries out the recording operation further and, as an inconvenience for the reserved video recording is detected, a message informing the user of the inconvenience is issued.

As the start time of the reserved video recording is approaching, the CPU 21 uses an embedded timer and a clock signal to automatically restore the optical-disc apparatus to an operating mode from a sleep mode. Then, the CPU 21 issues a file-system operation instruction included in the processing program from the beginning to allocate an area used for recording a reserved program on the optical disc 1. That is to say, first of all, the CPU 21 subtracts the start time from the end time of the reserved recording to find the length of the recording time and, then, calculates a product of the length of the recording time and the bit rate to find the size of the necessary area to be allocated for recording the reserved program. In addition to a stream file required in the reserved recording, data may need to be stored in an information file. To be more specific, when a new title needs to be stored in a title information file, an area has to be allocated on the optical disc 1 for recording the title information file. If an area with a sufficient size can not be allocated, it is necessary to adopt the countermeasure technique described above, that is, reduction of the bit rate or carrying out a recording operation only for a period of time corresponding to the allocated area.

It should be noted that, since a new title is stored in this case, the user gives a name to a new stream file, strictly speaking, to a new stream file in a new stream directory. Let the name be ¥MPEGAV¥STREAM_003¥ CHUNK_0031. That is to say, the name of the stream file is CHUNK_0031.MPEG2 in the STREAM_003 directory under the MPEGAV directory in the root directory as shown in FIG. 29.

The CPU 21 issues instructions of execution in the recording mode to other components of the optical-disc apparatus. For example, a video signal received through the input terminal P3 and an audio signal through the input terminal P4 from a tuner not shown in the figure are encoded by the encoder 10 and then stored in a write-in channel buffer 11. Then, the CPU 21 moves the optical head 2 to a write position determined by information on an address of the area allocated earlier. The CPU 21 then sets the optical head 2, the RF & demodulation/modulation circuit 3 and the ECC circuit 4 in a write-in mode and positions the switch 5 on the side of the write-in channel buffer 11. After the position of the optical head 2 has been finely adjusted, a write-in operation using the optical head 2 is started. At that time, data to be recorded in a newly provided file named CHUNK_0031.MPEG2 is read out from the write-in channel buffer 11 to be recorded onto the optical disc 1 by way of the switch 5, the ECC circuit 4, the RF & demodulation/modulation circuit 3 and the optical head 2.

When one of the following events occurs during the write-in operation described above, the CPU 21 halts the operation.

1 The end time of the reserved video recording is reached.
2 Information can no longer be recorded onto the optical disc 1 due to a reason such as an insufficient storage capacity.
3 An instruction to stop the recording operation is received.

Next, by using a file-system operation instruction included in the processing program in advance, the CPU 21 updates a pointer pointing to CHUNK_0031.MPEG2 in the file system with a value pointing to a location at which information has been newly recorded. In addition, the CPU 21 prepares files respectively for chunk information, chunk-group information and title information, gives a name to each of the files and records the information into the files. It should be noted that free spaces for recording the files need to be allocated in advance on the optical disc 1 during the recording operation or at the reservation time.

As a result, new information files are created typically as shown in FIG. 30. In the figure, files names each with an asterisk mark '*' provided on the right side thereof are the names of the files newly created in the operation described above.

Figure 31:
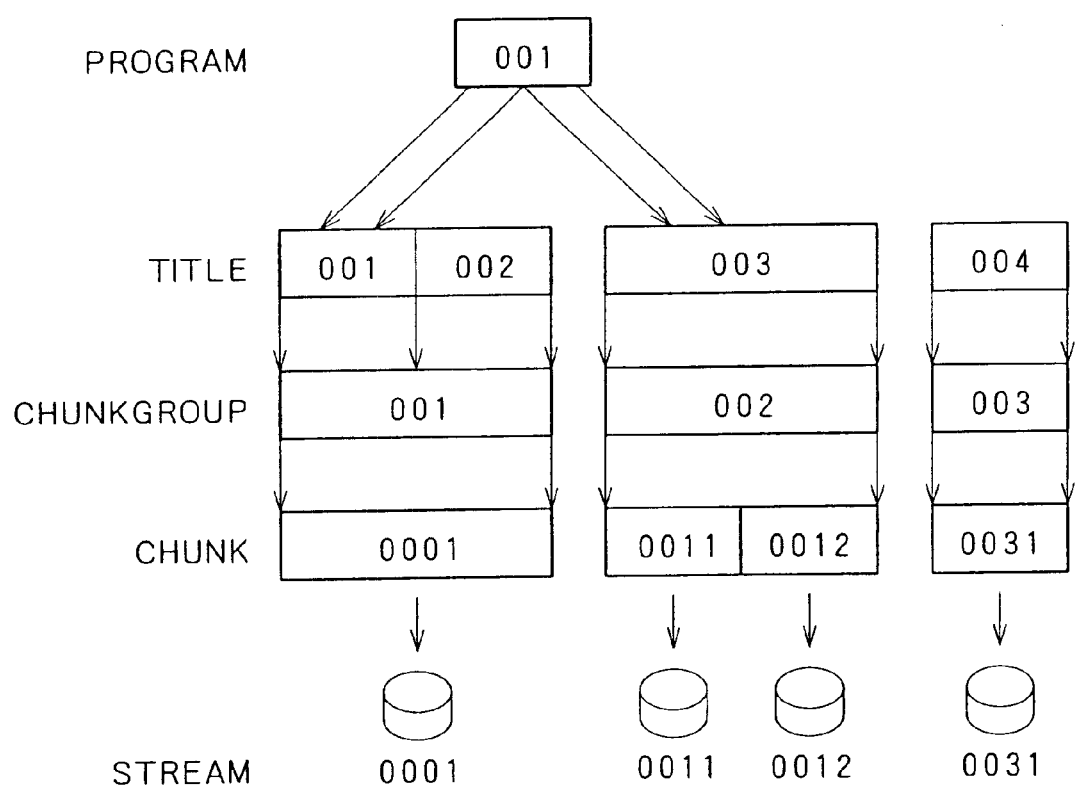
FIG. 31 is an explanatory diagram used for describing a logical organization of directories.

FIG. 31 is a diagram showing a relation among the newly created information files. As shown in the figure, TITLE_004 specifies CHUNKGROUP_003 specifying CHUNK_0031 which specifies STREAM_0031.

That is to say, a new stream is recorded in an information file as TITLE_004. By using a function of the optical-disc apparatus to verify a title, the user is capable of knowing information such as attributes of TITLE_004. In addition, TITLE_004 can be played back.

The following is a description of an operation to overwrite/record information on an optical disc 1 like one shown in FIG. 26 (or FIG. 27). Much like an operation to record a signal onto a video tape, an overwrite-record operation is an operation to record a new program over an existing program already recorded on the optical disc 1, erasing the existing program.

In the overwrite-record operation, a position to start the operation is important. Assume that the user specifies the head of TITLE_001 as a position to start an overwrite-record operation. In this case, the overwrite-record operation is carried out by overwriting existing information recorded in TITLE_001, TITLE_002 and TITLE_003 in an order they are enumerated. If the overwrite-record operation has not been finished even if the end of TITLE_003 is reached, the recording operation is continued by allocating a new free area on the optical disc 1. If TITLE_002 is specified as a location to start an overwrite-record operation, information in TITLE_001 will not be overwritten by the recording operation because TITLE_001 precedes the start location of the operation.

Assume that timer video recording is carried out by overwriting existing information starting with that at the head of TITLE_003. In this case, the user of the optical-disc apparatus specifies, among other things, a recording start time, a recording end time, the bit rate of a bit stream and a channel to be recorded in advance. In addition, the head of TITLE_003 is specified as a recording start location which is of importance to the overwrite-record operation. Furthermore, also in this case, at a point of time the video recording is reserved, the existence of a space suited for the bit rate and the video recording time on the optical disc 1 is verified in advance. In the case of an overwrite-record operation, a sum of the total size of a plurality of rewritable titles starting from a specified location and free areas on the optical disc 1 is a recordable space. To be more specific, in this case, a sum of the total size of STREAM_0011 and STREAM_0012 streams controlled by TITLE_003 and a free area on the optical disc 1 is a recordable space.

In a overwrite-record operation, for the recordable space described above, there are some items available for selection as to what order the video recording is to be actually carried out. As a first conceivable item of selection, it is possible to select a technique to record information in an order streams are specified in the title. To be more specific, in this case, it is possible to select a technique wherein the video recording is started from the head of STREAM_0011 and, as the end of STREAM_0011 is reached, the recording is continued to the head of STREAM_0012. Then, as the end of STREAM_0012 is reached, the video recording is continued to the free space on the optical disc 1. As another technique, first of all, the video recording is carried out on the free area on the optical disc 1 and, at a point of time the free area is all used up, the recording is continued to an existing stream.

The former technique is excellent in a sense that the technique emulates a video tape. That is to say, since the recording operation resembles an operation to record information onto a video tape, the operation is characterized in that the user is capable of comprehending the operation with ease. On the other hand, characterized in that an already recorded stream is erased later, the latter technique is excellent in a sense that recorded information is protected.

It should be noted that, if another recording operation is carried out on the optical disc 1 between a time a reservation is made and a time to execute the reserved video recording, it is quite within the bounds of possibility that the confirmed free space for implementing the reserved video recording at the specified bit rate can not be allocated any more. In such a case, much like the append-record operation described earlier, the CPU 21 either automatically reduces the bit rate to a value smaller than the specified fore in order to record information for the reserved period of time, or records information for a period of time as long as possible by keeping the bit rate unchanged as it is.

As the start time of the reserved video recording is approaching, the optical-disc apparatus is restored from a sleep mode to an operating mode. The CPU 21 allocates all free areas on the optical disc 1. It is needless to say that there is also a method whereby a free area is not allocated at this point of time but allocated at a point of time such an area is required. For the sake of explanation simplicity, a required area is allocated prior to the start of recording.

It should be noted that since the size of a required area is known in advance in timer recording due to the fact that a start time, an end time and a bit rate are specified, only an area with a required size or a required size plus a certain additional margin can be allocated. In case it is necessary to record information files such as a case in which a title information file to be recorded as a new title is required during recording, however, an area with a size sufficient for recording the information files needs to be allocated.

A name is given to a new stream file, strictly speaking, a new stream file in a new stream directory. Let the name be ¥MPEGAV¥STREAM_002¥CHUNK_0031. That is to say, the name of the stream file is CHUNK_0031.MPEG2 in the STREAM_002 directory under the MPEGAV directory in the root directory as shown in FIG. 32.

A video signal received through the input terminal P3 and an audio signal through the input terminal P4 from a tuner not shown in the figure are encoded by the encoder 10 and then stored in a write-in channel buffer 11. Then, the CPU 21 moves the optical head 2 to a write position determined by information on an address of the area allocated earlier. The CPU 21 then sets the optical head 2, the RF & demodulation/modulation circuit 3 and the ECC circuit 4 in a write-in mode and positions the switch 5 on the side of the write-in channel buffer 11. After the position of the optical head 2 has been finely adjusted, a write-in operation using the optical head 2 is started. At that time, data to be recorded in a newly provided file named CHUNK_0031.MPEG2 is read out from the write-in channel buffer 11 to be recorded onto the optical disc 1 by way of the switch 5, the ECC circuit 4, the RF & demodulation/modulation circuit 3 and the optical head 2.

At that time, first of all, the stream file named CHUNK_0011.MPEG2 is rewritten. After the recording has reached the end of the stream file named CHUNK_0011.MPEG2, then, the operation is continued to a stream file named CHUNK_0012.MPEG2 prior to continuation to a stream file named CHUNK_0031.MPEG2.

While the processing described above is being carried out, the CPU 21 halts the write-in operation at a point of time any one of the 3 conditions described earlier is met.

Then, the CPU 21 executes a file-system operation instruction included in the processing program in advance to update the stream files, chunk information, chunk-group information and title information.

By the way, the configuration of files is changed with timing synchronized to completion of the write-in operation. For example, when recording is carried out on the stream file named CHUNK_0031.MPEG2 after the write-in operations of the 2 stream files named CHUNK_0011.MPEG2 and CHUNK_0012.MPEG2 have been completed, the configuration of files on the optical disc 1 is changed to one shown in FIG. 33. A file name with an asterisk mark '*' appended on the right side thereof is the name of a file newly created this time.

Figure 34:
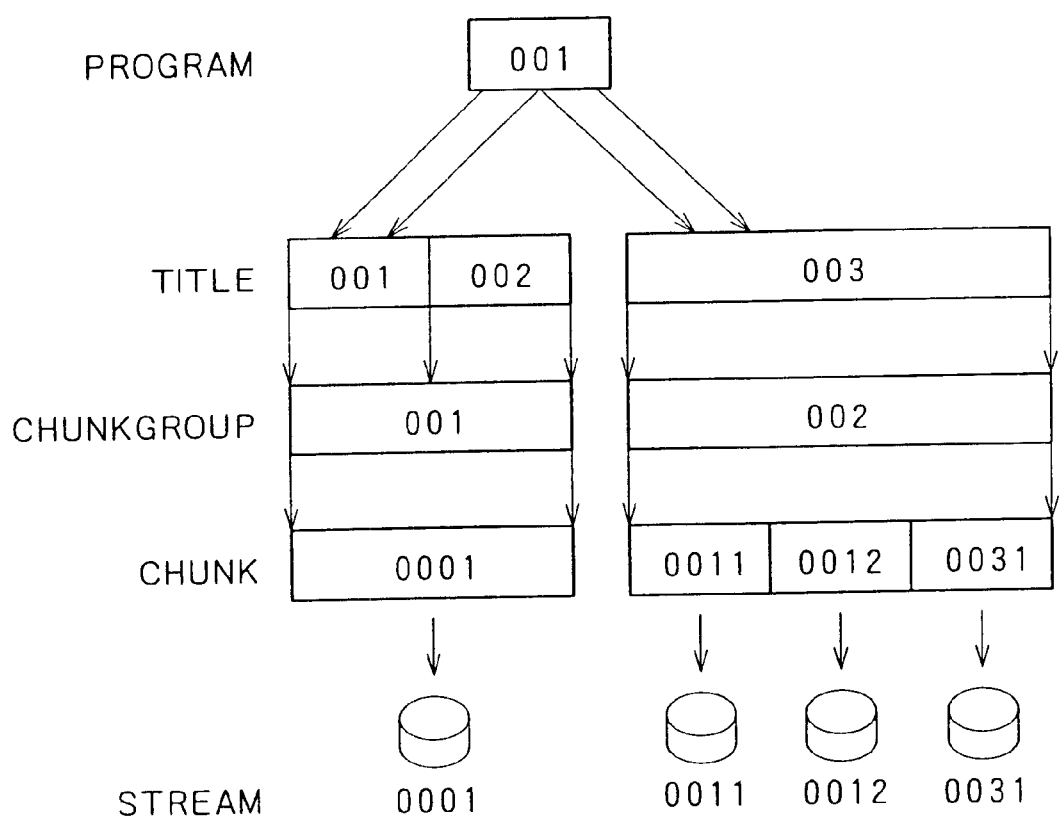
FIG. 34 is an explanatory diagram used for describing a logical organization of directories.

FIG. 34 is a diagram showing a relation of files newly created in this way, that is, files shown in FIG. 33. When compared with that shown in FIG. 31, it is obvious that CHUNK_0031 is added as a chunk included in CHUNKGROUP_002 specified by TITLE_003 and CHUNK_0031 specifies STREAM_0031.

Figure 35:
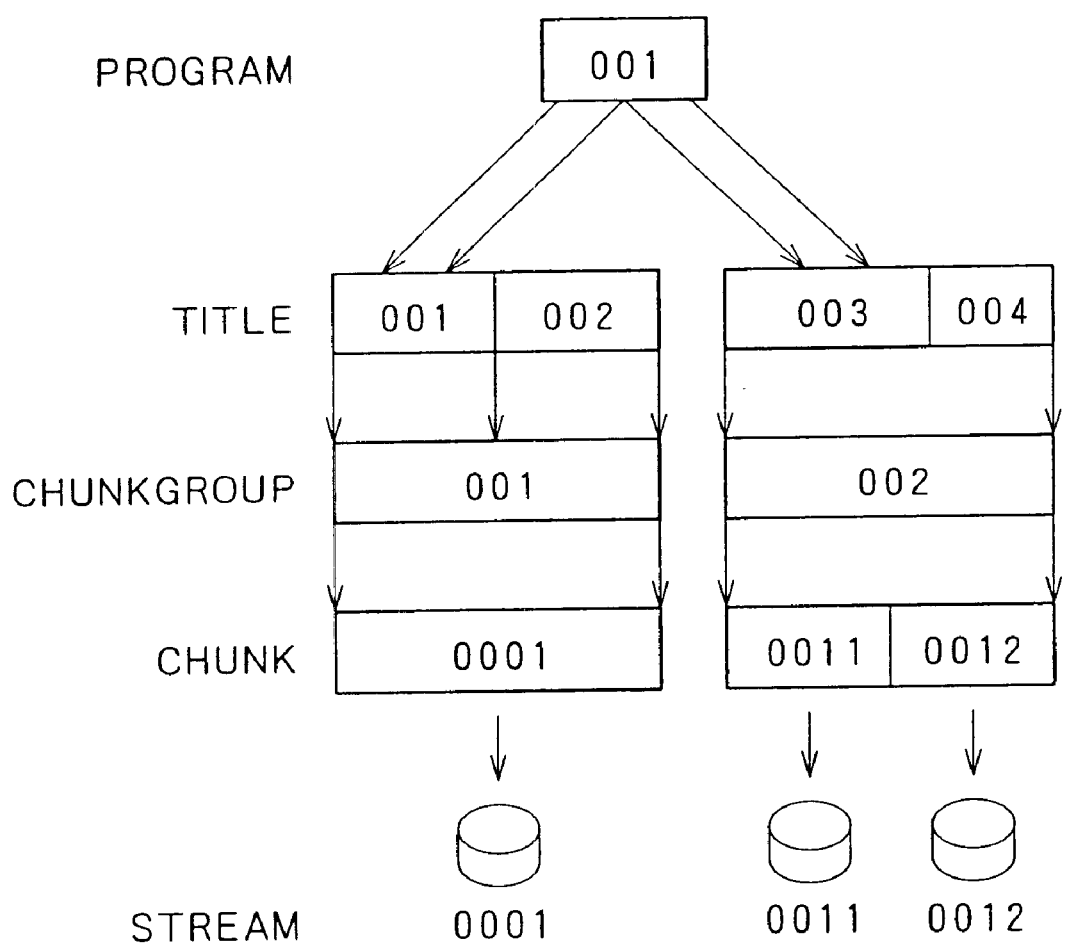
FIG. 35 is an explanatory diagram used for describing a logical organization of directories.

On the other hand, if the overwrite-record operation is completed while data is being written into an existing stream file, that is, if the overwrite-record operation is completed while data is being written into the stream file named CHUNK_0011.MPEG2 for example, the free area allocated for the overwrite operation on the stream file named CHUNK_0031.MPEG2 is released because no data is overwritten into the file. In this case, special title processing is carried out. To put it in detail, when an overwrite-record operation is started at the head of TITLE_003 and the operation is completed in the middle of it, the title is split. To be more specific, as shown in FIG. 35, new TITLE_003 is assigned to a region between the start position of the overwrite-record operation and the position of completion whereas TITLE_004 is given to an area following the region, that is, the rest of the area to which TITLE_003 is supposed to be assigned originally.

Next, an operation to play back a title is explained. Now, assume that an optical disc 1 having files shown in FIG. 26 is inserted into the optical-disc apparatus and a title is then played back from the disc 1. When the optical disc 1 is inserted into the apparatus, first of all, the CPU 21 reads out data from information files on the optical disc 1 and stores the data into the RAM unit 24. This processing is carried out by repeating the basic operation to read in data from an information file described earlier.

To be more specific, first of all, the CPU 21 reads out data from VOLUME.TOC and ALBUM.STR. Then, the CPU 21 examines the directory named TITLE to find out how many files with a name extension ".VDR" exist in the directory. A file with such a name extension is a file having title information. The number of files is equal to the number of titles. In the example shown in FIG. 26, the number of titles is three. Then, the CPU 21 reads out title information from the three files and stores the information into the RAM unit 24.

The CPU 21 controls the OSD control circuit 9 to let the OSD control circuit 9 generate character information, that is, information on titles recorded on the optical disc 1. The character information is synthesized by the synthesis circuit 8 with a video signal. A result of the synthesis is then output through the output terminal P1 to be displayed on the display unit. To be more specific, the length and attributes of each of the 3 existing titles existing in this example are displayed. The attributes include the name of the title and a date on which the title was recorded.

Assume that the user specifies TITLE_002 as a title to be played back for example. In the information file of TITLE_002, to be more specific, in the cgit_file_id field of title_info ( ) shown in FIG. 16, a file ID specifying CHUNKGROUP_001 is recorded. The CPU 21 records the file ID and stores CHUNKGROUP_001 in the RAM unit 24.

Then, the CPU 21 examines which CHUNK the start and end times of TITLE_002 correspond to. The start and end times are recorded respectively in the title_start_chunk_group_time_stamp and title_end_chunk_group_time_stamp fields of title_info ( ) shown in FIG. 16. The examination is carried out by comparison with information included in information on a CHUNKGROUP in which their respective chunks have been recorded. To be more specific, the examination is done by comparison with information recorded in the presentation_start_cg_time_count and presentation_end_cg_time_count fields of chunk_arrangement_info ( ) shown in FIG. 23. In this example, the start time of TITLE_002 is known to be in the midst of CHUNK_0001 as shown in FIG. 27. That is to say, it is obvious that, in order to play back TITLE_002 from the head thereof, the playback operation needs to be started from the middle of the CHUNK_0001.MPEG2 stream file.

Subsequently, the CPU 21 examines the stream in order to determine which part of the stream corresponds to the head of TITLE_002. That is to say, the CPU 21 computes the magnitude of an offset time (a time stamp) in the stream corresponding to the head of TITLE_002. Next, by using characteristic-point information in the CHUNK file, a playback start point corresponding to a point immediately before the start time is identified. In this way, an offset distance of the playback start point from the head of the file can be confirmed.

Then, by using a file-system operation instruction included in the processing program in advance, the CPU 21 confirms a physical address on the optical disc 1 in which CHUNK_0001.MPEG2 has been recorded and the length thereof. Further, the offset address of the playback start point found earlier is added to this physical address to finally confirm the address of the playback start point of TITLE_002.

Subsequently, the CPU 21 moves the optical head 2 to a read-out position determined by information on the address of the CHUNK_0001.MPEG2 file. The CPU 21 then sets the optical head 2, the RF & demodulation/modulation circuit 3 and the ECC circuit 4 in a read-out mode-and positions the switch 5 on the side of the read-out channel buffer 6. After the position of the optical head 2 has been finely adjusted, a read-out operation using the optical head 2 is started. At that time, data read out from the file named CHUNK_0001.MPEG2 is stored in the readout channel buffer 6.

The data stored in the read-out channel buffer 6 is then output to the decoder 7 to be decoded thereby. As results of decoding, the decoder 7 outputs video and audio signals. At a point of time the amount of the data read out from the optical disc 1, decoded by the decoder 7 and displayed on the display unit becomes equal to the size of the CHUNK_0001.MPEG2 file, the CPU 21 makes the playback operation transit to TITLE_003. An operation to play back information from TITLE_003 is carried out in the same way as TITLE_002.

As the operation to play back data from the recorded titles is completed or as an instruction to halt the read-out operation is received, the read-out and decoding processing is terminated.

It should be noted that, when a new disc or a disc with a different format is inserted into the optical-disc apparatus as the optical disc 1, the CPU 21 makes an attempt to read out VOLUME.TOC and ALBUM.STR from the inserted disc. However, these files usually do not exist in the newly inserted disc. In such a case, that is, in case VOLUME.TOC and ALBUM.STR can not be read out, the CPU 21 issues a message to make a request for an instruction from the user. In response to the message, the user gives an instruction to the CPU 21 to eject the optical disc 1 in case the newly inserted disc has a different format, or to initialize the optical disc 1 in case the newly inserted disc is a new disc even with the same format. As an alternative, the instruction may cause data on the newly inserted disc to be recovered by using some methods in case the data has been destroyed from the disc which has the same format.

Next, resume ( ) shown in FIG. 5 is explained more. Assume that an optical disc 1 is once removed (ejected) from a recording/playback apparatus with the head positioned at an accessed location on the disc 1. The optical disc 1 basically does not have a property to save an accessed location on the disc 1 immediately prior to the eject operation so that the head can not be restored to the location after the disc 1 is inserted again into the recording/playback apparatus while a magnetic tape inherently has this property as a matter of course. In order to solve this problem, there is provided a resume function whereby an accessed position on the optical disc 1 immediately prior to an eject operation is recorded on the optical disc 1 as data so that, when the optical disc 1 is inserted again into the recording/playback apparatus, the data is read in back to restore a state immediately prior to the eject operation.

resume_length is an area used for recording the length of resume ( ) expressed in terms of bytes. resume_switch is an area used for recording a flag to indicate whether resume-function related information is valid or invalid. The flag is used to temporarily enable and disable the resume function without the need to change or to rewrite the resume-function related information. As shown in FIG. 36, a value of 0 set in this flag indicates that the resume-function related information is invalid. On the other hand, a value of 1 indicates that the resume information is valid. If such a flag is not provided, the resume function can be disabled only by removing the resume-function related information which serves as a base of the function. That is to say, in order to disable the resume function, it is necessary to erase the resume-function related information itself. If it is desired to erase the resume-function related information only temporarily, it is necessary to save the information in a certain area. By providing this flag, however, it is possible to temporarily enable and disable the resume function without the need to change or to rewrite details of the resume-function related information, that is, it is possible to temporarily enable and disable the resume function by leaving the resume-function related information as it is.

resume_auto_execute_time_flag is an area used for recording a flag to indicate whether or not a time to execute the resume function has been set. If it is desired to execute the resume function at a specified time and date, set this flag at a value of 1 to indicate that the specified time and date are valid as shown in FIG. 37. If it is not desired to execute the resume function, on the other hand, set this flag at a value of 0 to indicate that the specified time and date are invalid.

resume_auto_execute_time ( ) is an area used for recording a time and a date at which the resume function is to be executed. These time and date are valid when resume_auto_execute_time_flag described above has a value of 1 to indicate that the time and date are valid. resume_auto_execute_record_number is an area used for recording the number of a resume record to be executed at a time and a date specified in resume_auto_execute_time ( ). The number of a particular resume record is a number in a sequence of resume records obtained as a result of counting the number of resume records starting from 1 with a resume record at the head of the sequence and ending at the particular resume record. A record represents the contents of areas specified in the block of the "for" statement shown in FIG. 5.

resume_mode_flag is an area used for recording a flag shown in FIG. 38 to indicate the status, strictly speaking, the status immediately prior to ejection of the optical disc 1, of the player, that is, the optical-disc apparatus, set by the resume function. In addition to the position of the head on the optical disc 1 immediately prior to ejection of the optical disc 1, the resume function also saves data such as information indicating whether the operation itself immediately prior to ejection of the optical disc 1 was a recording or playback operation and an operating mode in the case of a playback operation to indicate whether the playback operation is an operation to play back a title or a program. The information indicating the type of the operation and the operating mode are saved in resume_mode_flag. As shown in FIG. 38, the flag may indicate that the operation immediately prior to ejection of the optical disc 1 to be resumed by the resume function can be an operation such as a playback operation, a recording operation to add information to existing one, a recording operation to write information over existing one or an autoplay operation. In the case of a recording operation to write information over existing one, the start point of the video recording is a delimiter between titles or between chunks. Thus, specifying the number of a chunk as a start point of the video recording operation will give sufficient precision.

As shown in FIG. 39, object_type is an area used for recording the type of an object of the resume function which can be a title, a program, a play item or another object.

linked_record_number is an area used for recording the number of a record to be executed at the same time. Since each record is assigned to an input/output channel, linked_record_number is used to resume an operation on a plurality of input/output channels. A value of 0 set in linked_record_number indicates an operation to resume a standalone input/output channel. Thus, it is possible to specify a resume position for each channel of a multichannel operation such as simultaneous recording and playback operations, a 2-channel simultaneous playback operation and a 2-channel simultaneous recording operation.

number_of_times is an area used for recording the number of times a specified title or a specified program can be played back. A value of "FF" indicates that a specified title or a specified program can be played back an infinite number of times. A value of 1 indicates that a specified title or a specified program can be played back only once.

resume_update_time ( ) is an area used for recording a time and a date at which resume ( ) was recorded and modified. A date and a time in resume_update_time ( ) are expressed in terms of years, months, days, hours, minutes and seconds. A value of 0 indicates that neither time nor date are set therein.

title_number in the switch statement is an area used for recording the number of a title with which a playback operation is to be started provided that "title" is specified in object_type described above. title_local_time_stamp is an area used for recording a value of a local time stamp representing a playback start point in a title with the beginning of the title taken as an origin.

program_number in the switch statement is an area used for recording the number of a program with which a program playback operation is to be started provided that "program" is specified in object_type described above. program_local_time_stamp is an area used for recording a value of a local time stamp representing a playback start point in a program with the beginning of the program taken as an origin.

program_bind_number in the switch statement is an area used for recording the number of a program bind with which a resumed playback operation is to be started provided that "program_bind" is specified in object_type described above. Starting from 1, this number is an order number in album ( ) defined as a plurality of discs (volumes). The term "program" is used when the object is defined within a range in a single disc or volume while the term "program bind" is used when the object is defined in a range stretched over a plurality of discs.

program_order is an area used for recording an order number of a program with which a program playback operation is to be started. Starting from 1, the order number is the number of a program in a sequence of programs constituting a program bind. The order number of a specific program in the program bind is obtained of a result of counting the number of programs in the program bind starting with a program at the head of the program bind and ending at the specific program. program_number is an area used for recording the number of a program indicated by program_order. program_local_time_stamp is an area used for recording a value of a local time stamp representing a playback start point in a program with the beginning of the program taken as an origin.

play_item_number in the switch statement is an area used for recording the number of a play item with which a playback operation is to be started provided that "play_item" is specified in object_type described above. play_item_local_time_stamp is an area used for recording a value of a local time stamp representing a playback start point in a play item with the beginning of the play item taken as an origin.

Next, processing to record resume-function related information is explained by referring to a flowchart shown in FIG. 40. As shown in the figure, the processing starts with a step S1 at which the CPU 21 forms a judgment as to whether or not a command entered by the user by operating the input unit 14 is a command to eject the optical disc 1. If the command is not a command to eject the optical disc 1, the flow of the processing goes back to the step S1 to form the same judgment repeatedly till a command to eject the optical disc 1 is entered by the user. If the outcome of the judgment formed at the step S1 indicates that the command is a command to eject the optical disc 1, on the other hand, the flow of the processing goes to a step S2 at which the CPU 21 forms a judgment as to whether or not the value of resume_switch is 0. As described earlier by referring to FIGS. 2, 3 and 5, resume_switch is included in resume ( ) which is part of volume_information ( ). By the way, volume_information ( ) is included in VOLUME.TOC. Also as described earlier, VOLUME.TOC is read out from an optical disc 1 and stored in the RAM unit 24 when the optical disc 1 is mounted on the optical-disc apparatus. Thus, the judgment formed by the CPU 21 at the step S2 can be based on data stored in the RAM unit 24.

If the outcome of the judgment formed at the step S2 indicates that the value of resume_switch is not 0, that is, if the value of resume_switch is 1, the flow of the processing proceeds to a step S3 at which the CPU 21 controls the OSD control circuit 9 to generate a message showing an inquiry about whether or not the resume-function related information is to be updated this time. The message is output from the synthesis circuit 8 to the display unit by way of the output terminal P1 to be displayed to the user. This is because a value of 1 set in resume_switch indicates that the resume-function related information is valid and, if updated, the valid information will be rewritten.

In response to the displayed message, the user enters a command specifying whether or not the resume-function related information is to be overwritten by operating the input unit 14. The flow of the processing then continues to a step S4 at which the CPU 21 forms a judgment as to whether or not the command entered by the user via the input unit 14 requests that the resume-function related information be overwritten. If the command does not specify overwriting of the resume-function related information, the command is judged to be the user's intention to keep the resume-function related information as it is. In this case, the flow of the processing continues to a step S12 at which an operation to eject the optical disc 1 is carried out.

If the outcome of the judgment formed at the step S2 indicates that the value of resume_switch is 0 or if the outcome of the judgment formed at the step S4 indicates that the command entered by the user requests that the resume-function related information be overwritten, on the other hand, the flow of the processing continues to a step S5 at which the CPU 21 records a location on the optical disc 1 accessed most recently by the optical head 2 as a time stamp for the type of an accessed object.

To put it in detail, the CPU 21 records the type of an object on the optical disc 1 subjected to a recording or playback operation most recently in object_type in the RAM unit 24. As shown in FIG. 39, the object can be a title, a program or a play item.

As shown in FIG. 5, if the type of the object is a title, the location on the optical disc 1 accessed most recently in a recording or playback operation by the optical head 2 is recorded in title_local_time_stamp in the RAM unit 24. By the same token, if the type of the object is a program, the most recent recording or playback location on the optical disc 1 is recorded in program_local_time_stamp and if the type of the object is a play item, on the other hand, the location is recorded in play_item_local_time_stamp.

Then, the flow of the processing continues to a step S6 at which the CPU 21 records the most recent operating mode in resume_mode_flag in the RAM unit 24. To put it in detail, as shown in FIG. 38, if the most recent operating mode is playback, a value of "0001" is recorded in the flag to indicate the playback operating mode whereas, if the most recent operating mode is appending recording, a value of "0010" is recorded in the flag to indicate the appending-recording operating mode. If the most recent operating mode is overwriting recording, a value of "0011" is recorded in the flag to indicate the overwriting-operating mode whereas, if the most recent operating mode is automatic playback, a value of "0100" is recorded in the flag to indicate the autoplay operating mode.

The flow of the processing then goes on to a step S7 at which the CPU 21 controls the OSD control circuit 9 to generate a message showing an inquiry about whether or not other resume-function related information such as resume_auto_execute_time is also to be recorded this time. The message is output from the synthesis circuit 8 to the display unit by way of the output terminal P1 to be displayed to the user. In response to the displayed message, the user enters a command specifying whether or not the other resume-function related information is also to be recorded by operating the input unit 14. The flow of the processing then continues to a step S8 at which the CPU 21 forms a judgment as to whether or not the command entered by the user via the input unit 14 requests that the other resume-function related information also be recorded. If the command entered by the user requests that the other resume-function related information also be recorded, the flow of the processing goes on to a step S9 to carry out processing to obtain the other resume-function related information. To put it in detail, the CPU 21 controls the OSD control circuit 9 to generate GUI data for inputting the other resume-function related information. The GUI data is output from the synthesis circuit 8 to the display unit by way of the output terminal P1 to be displayed to the user. In turn, the user utilizes the GUI data to enter the other resume-function related information.

Subsequently, the flow of the processing proceeds to a step S10 at which the CPU 21 forms a judgment as to whether or not the operation carried out by the user to enter the other resume-function related information has been completed. If the operation has not been completed, the flow of the processing goes back to the step S9 to repeat the execution of the processing at that step and the subsequent processing.

If the outcome of the judgment formed at the step S8 indicates that the command does not specify overwriting of the resume-function related information, on the other hand, the flow of the processing continues to a step S11, skipping the steps S9 and S10. In addition, if the outcome of the judgment formed at the step S10 indicates that the operation carried out by the user to enter the other resume-function related information has been completed, the flow of the processing also continues to the step S11. At the step S11, the CPU 21 carries out processing to record the resume-function related information stored in the RAM unit 24 into the optical disc 1. To put it in detail, the resume-function related information stored in the RAM unit 24 is first supplied to the write-in channel buffer 11 before being further transferred to and recorded onto the optical disc 1 by way of the switch 5, the ECC circuit 4, the RF & demodulation/modulation circuit 3 and the optical head 2.

After information on a state immediately prior to ejection of the optical disc 1 has been recorded into the optical disc 1 as resume-function related information as described above, the flow of the processing goes on to a step S12 at which the CPU 21 carries out processing to eject the optical disc 1.

The following is a description of processing to resume an operation to record or play back information onto or from the optical disc 1 with the resume-function related information recorded thereon which is mounted again after being ejected once with reference to a flowchart shown in FIGS. 41 and 42.

As shown in FIG. 41, the processing begins with a step S21 at which the CPU 21 repeatedly forms a judgment as to whether or not the optical disc 1 has been mounted again till the disc 1 is mounted. As the optical disc 1 is mounted, the flow of the processing goes on to a step S22 at which the CPU 21 lets the optical head 2 play back VOLUME.TOC recorded on the optical disc 1. The reproduced data is supplied to and stored temporarily in the read-out channel buffer 6 by way of the RF & demodulation/modulation circuit 3, the ECC circuit 4 and the switch 5. The data is further transferred from the read-out channel buffer 6 to the RAM unit 24 to be stored therein.

The flow of the processing then proceeds to a step S23 at which the CPU 21 reads in resume( ) from VOLUME.TOC stored in the RAM unit 24 as described above. Then, the flow of the processing continues to a step S24 at which the CPU 21 forms a judgment as to whether or not resume_switch included in resume( ) has a value of 1. If the value of resume_switch is not 1, that is, if the value of resume_switch is 0, the flow of the processing proceeds to a step S37 at which the CPU 21 controls the OSD control circuit 9 to generate a message stating that the resume function is not executed. The message is output from the synthesis circuit 8 to the display unit by way of the output terminal P1 to be displayed to the user. This is because a value of 0 set in resume_switch indicates that the resume-function related information is invalid, indicating that the resume function is disabled.

If the outcome of the judgment formed at the step S24 indicates that the value of resume_switch is 1, on the other hand, the flow of the processing proceeds to a step S25 at which the CPU 21 forms a judgment as to whether or not resume_auto_execute_time_flag has a value of 1. If the value of resume_auto_execute_time_flag is not 1, that is, if the value of resume_auto_execute_time_flag is 0, the flow of the processing proceeds to steps S26, S27 and S28 at which the CPU 21 forms judgments as to whether or not resume_mode_flag is playback, record (add) or record (overwrite) respectively.

If the outcome of the judgment formed at the step S26 indicates that resume_mode_flag is playback, the flow of the processing goes on to a step S29 at which the CPU 21 carries out an operation to play back an object specified by object_type starting from a position specified by a time stamp for the object. To be more specific, if object_type indicates that the object is a title, the title is played back starting from a position specified by title_local_time_stamp. If object_type indicates that the object is a program, on the other hand, the program is played back starting from a position specified by program_local_time_stamp. Finally, if object_type indicates that the object is a play item, the play item is played back starting from a position specified by play_item_local_time_stamp.

If the outcome of the judgment formed at the step S27 indicates that resume_mode_flag is record (add), the flow of the processing goes on to a step S30 at which the CPU 21 carries out a recording operation to append information to an existing object specified by object_type starting from a position specified by a time stamp for the object.

If the outcome of the judgment formed at the step S28 indicates that resume_mode_flag is record (overwrite), the flow of the processing goes on to a step S31 at which the CPU 21 carries out a recording operation to write information over an object specified by object_type starting from a position specified by a time stamp for the object.

As described above, when the optical disc 1 is inserted into the optical-disc apparatus, at the steps S26 to S31, the operation carried out immediately prior to the ejection of the optical disc 1 is resumed from a position immediately before the ejection.

After such processing has been carried out, the flow of the processing goes on to a step S32 at which the CPU 21 changes the value of resume_switch to a value of 0. This is because, having been used to execute the resume function, the resume-function related information needs to be made no longer valid. As a result, when the optical disc 1 is ejected again, the outcome of the judgment formed at the step S2 of the flowchart shown in FIG. 40 will indicate resume_switch=0, causing the resume-function related information to be updated in the processing carried out at the step S5 and the subsequent processing.

If the outcome of the judgment formed at the step S25 indicates that the value of resume_auto_execute_time_flag is 1, on the other hand, the flow of the processing goes on to a step S33 at which the CPU 21 controls the OSD control circuit 9 to generate a message showing an inquiry about whether or not the resume function is to be executed and, if the resume function is to be executed, whether or not to put the optical-disc apparatus in a wait state. The message is output from the synthesis circuit 8 to the display unit by way of the output terminal P1 to be displayed to the user. In response to the displayed message, the user enters a command specifying whether or not the resume function is to be executed and, if the resume function is to be executed, whether or not to put the optical-disc apparatus in a wait state by operating the input unit 14.

The flow of the processing then proceeds to a step S34 at which the CPU 21 forms a judgment as to whether or not the command entered by the user specifies that the resume function be executed. If the command specifies that the resume function is not to be executed, the processing is ended. If the outcome of the judgment formed at the step S34 indicates that the command entered by the user requests execution of the resume function, on the other hand, the flow of the processing continues to a step S35 at which the CPU 21 forms a judgment as to whether or not the command entered by the user specifies that the optical-disc apparatus be put in a wait state. If the command specifies that the optical-disc apparatus be put in a wait state, the flow of the processing goes on to a step S36 at which the CPU 21 forms a judgment as to whether or not the present time has reached resume_auto_execute_time which was entered by the user as other resume-function related information at the step S9 of the flowchart shown in FIG. 40. If the present time has not reached resume_auto_execute_time, the flow of the processing goes back to the step S36 to repeat the formation of the judgment. This loop is repeated till the present time has reached resume_auto_execute_time. As the present time reaches resume_auto_execute_time, the flow of the processing returns to the step S26 to carry out the processing of this step and the subsequent processing. In addition, if the outcome of the judgment formed at the step S35 indicates that the command entered by the user specifies that the optical-disc apparatus is not to be put in a wait state, on the other hand, the flow of the processing returns to the step S26 directly, skipping the processing of the step S36.

By the way, a reserved video-recording function whereby a video-recording operation is to be started at a time and a date specified in advance and to be ended at a specified time can also be executed as a resume function. The following is a description of an example of a reservation of a video-recording operation by utilizing the resume function.

Traditionally, the related-art recorder waits till the present time reaches a time and a date specified in the recorder in advance to carry out a reserved video-recording operation. Taking the advantage of the fact that information can be recorded into a writable recording medium, however, the recording medium can be assumed to be usable for recording also information on a time and a date specified in advance to carry out a reserved video-recording operation. This assumption leads us to think implementation of a new function that was not available so far.

Consider a case in which a disc is transferred from one video recorder to another. At that time, if information on a video-recording reservation has been recorded on the disc at the video recorder, it is not necessary to reenter the information at the other video recorder because the information is also transferred to the other recorder along with the disc.

In addition, by setting a rule to record only a program specified by information on a video-recording reservation on a disc on which the information is recorded, a new function can be implemented. With this new function, a video recorder for accommodating a plurality of discs is capable of allocating programs to be recorded to different discs. Thus, if a specific program is broadcasted only once a week, for example, this program can be recorded and accumulated on a specific disc. As a result, it is possible to make a disc containing a series of specific broadcasted programs. Such a new program is considered to be particularly useful for a video recorder having a disc-changer facility which allows the recorder to accommodate a plurality of discs.

In implementing a video-recording reservation, it is necessary that the user is allowed to set a time and date to end video recording along with a time and date to start the recording. FIG. 43 is a diagram showing an extended structure of resume ( ) shown in FIG. 5. The extended structure allows the function of video-recording reservation to be implemented.

Next, new information fields added to the extended structure of resume ( ) shown in FIG. 43 are explained as follows.

logical_input_source_number is an area used for recording information specifying a source of a video signal to be input in the video-recording operation. In the resume-function related information for resuming recording and playback operations, this new field is not included. resume_start_time ( ) is an area used in a video-recording reservation for recording a time and a date to start video recording. On the other hand, resume_end_time ( ) is an area used in a video-recording reservation for recording a time and a date to end video recording. In order to make a video-recording reservation effective, it is necessary to include considerations such as making resume_auto_execute_time ( ) invalid by setting resume_auto_execute_time_flag at a value indicating that resume_auto_execute_time ( ) is invalid. holding_flag is an area used for recording a flag specifying whether or not to hold the resume-function related information in the video recorder even if the disc is ejected. maximum_mux_rate is an area used for recording a bit rate of video recording in case such a rate is specified in the video-recording reservation. That is to say, the bit rate can be set by the user or the video recorder.

Processing to record information on a video-recording reservation onto a disc or a memory in a video recorder is explained by referring to a flowchart shown in FIG. 44.

As shown in the figure, the processing begins with a step S40 at which the user carries out an operation to make a request for a video-recording reservation. The flow of the processing then goes on to a step S41.

At the step S41, the CPU 21 controls the OSD control circuit 9 to generate a message showing an inquiry about whether to implement the video-recording reservation by using an EPG (Electronic Program Guide) or by manual specification of a channel as well as start and end times/dates. The message is output from the synthesis circuit 8 to the display unit by way of the output terminal P1 to be displayed to the user. In response to this inquiry, the user selects the desired way of video-recording reservation by operating the input unit 14.

If the user desires specification of a program by the EPG, the flow of the processing goes on to a step S46. At the step S46, the CPU 21 outputs a table of programs from the synthesis circuit 8 to the display unit by way of the output terminal P1 to be displayed to the user. The user then selects a desired program from the table, entering the program to the video recorder by operating the input unit 14. As the user enters the desired program, the flow of the processing proceeds to a step S47.

At the step S47, the CPU 21 acquires information on an event (that is, a program) such as an event ID, a start time and a duration necessary for the video-recording reservation from an EIT (Event Information Table). After the information has been acquired, the flow of the processing continues to a step S48.

If the user expresses a desire for specification of a program not by resorting to the EPG in response to the inquiry made by the CPU 21 at the step S41, on the other hand, the flow of the processing continues to a step S42 at which the CPU 21 controls the OSD control circuit 9 to generate a message showing an inquiry about a source from which the audio and video signals are to be input. The message is output from the synthesis circuit 8 to the display unit by way of the output terminal P1 to be displayed to the user. In response to this inquiry, the user selects a source by operating the input unit 14. The CPU 21 sets the source entered by the user in logical_input_source_number.

Then, the flow of the processing goes on to a step S43 at which the CPU 21 controls the OSD control circuit 9 to generate a message showing an inquiry about a time to start video recording. The message is output from the synthesis circuit 8 to the display unit by way of the output terminal P1 to be displayed to the user. In response to this inquiry, the user specifies a start time by operating the input unit 14. The CPU 21 then sets the start time entered by the user in resume_start_time ( ). The flow of the processing then goes on to a step S44.

At the step S44, the CPU 21 controls the OSD control circuit 9 to generate a message showing an inquiry about a time to end video recording. The message is output from the synthesis circuit 8 to the display unit by way of the output terminal P1 to be displayed to the user. In response to this inquiry, the user specifies an end time by operating the input unit 14. The CPU 21 then sets the end time entered by the user in resume_end_time ( ).

Subsequently, the flow of the processing goes on to a step S45 at which the CPU 21 controls the OSD control circuit 9 to generate a message showing an inquiry about a maximum bit rate allowable during the video recording. The message is output from the synthesis circuit 8 to the display unit by way of the output terminal P1 to be displayed to the user. In response to this inquiry, the user specifies a maximum bit rate by operating the input unit 14. The CPU 21 then sets the bit rate entered by the user in maximum_mux_rate ( ).

The flow of the processing then goes on to a step S48 at which the CPU 21 sets "title" as a type of the object to be recorded. Then, the flow of the processing proceeds to a step S49 at which the CPU 21 carries out processing to input other resume-function related information if deemed necessary.

In the processing carried out so far at the steps described above, the CPU 21 stores all information on a video-recording reservation in the RAM unit 24 temporarily as a sort of resume-function related information. Subsequently, the flow of the processing proceeds to a step S50 at which the CPU 21 carries out processing to transfer the information on a video-recording reservation recorded in the RAM unit 24 to the optical disc 1. To put it in detail, the resume-function related information recorded in the RAM unit 24 is supplied to the optical disc 1 to be recorded thereon by way of the write-in channel buffer 11, the switch 5, the ECC circuit 4, the RF & demodulation/modulation circuit 3 and the optical head 2.

Figure 45B:
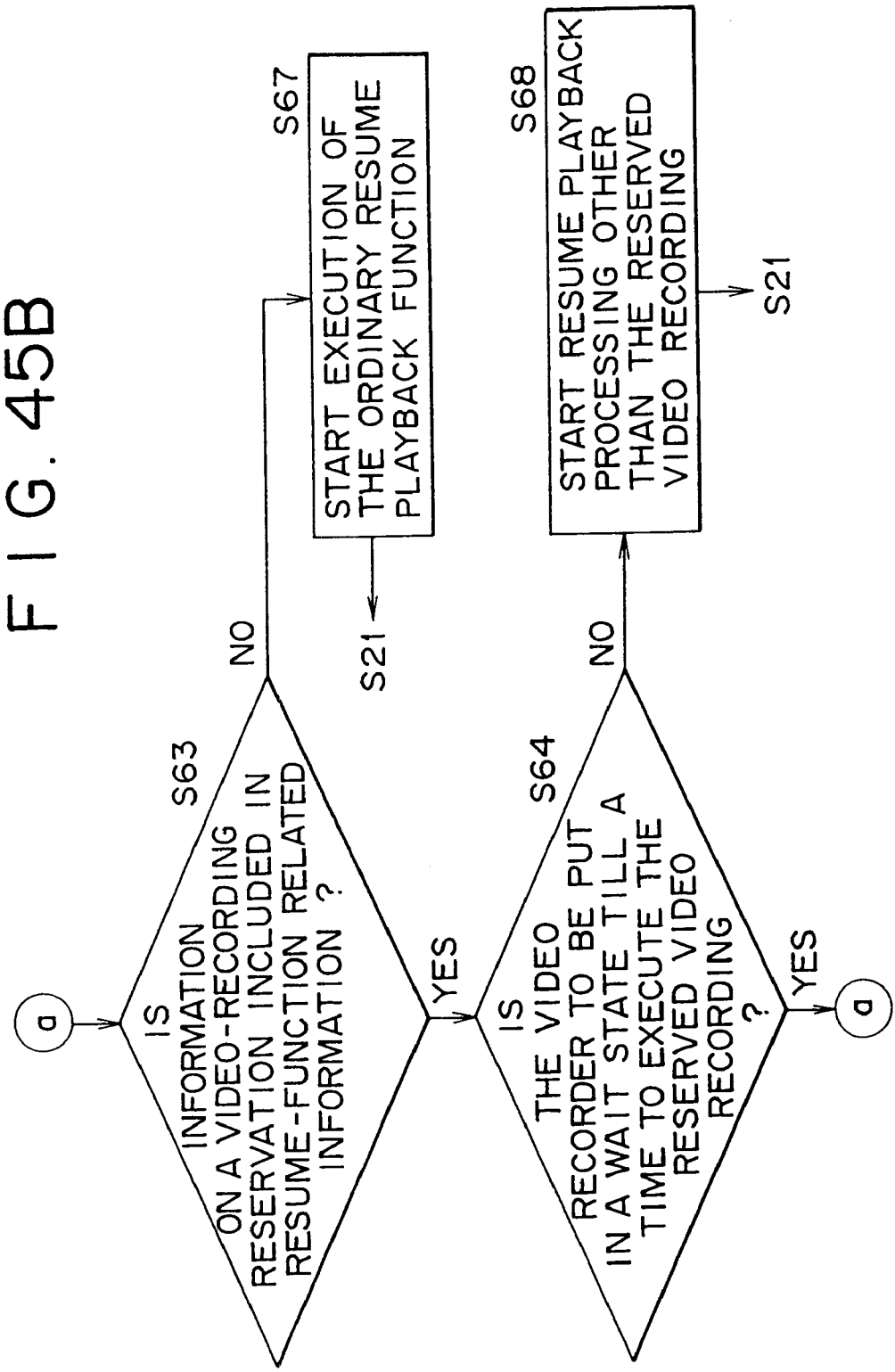
FIG. 45 is a flowchart used for explaining processing to carry out reserved video recording.
Figure 45C:
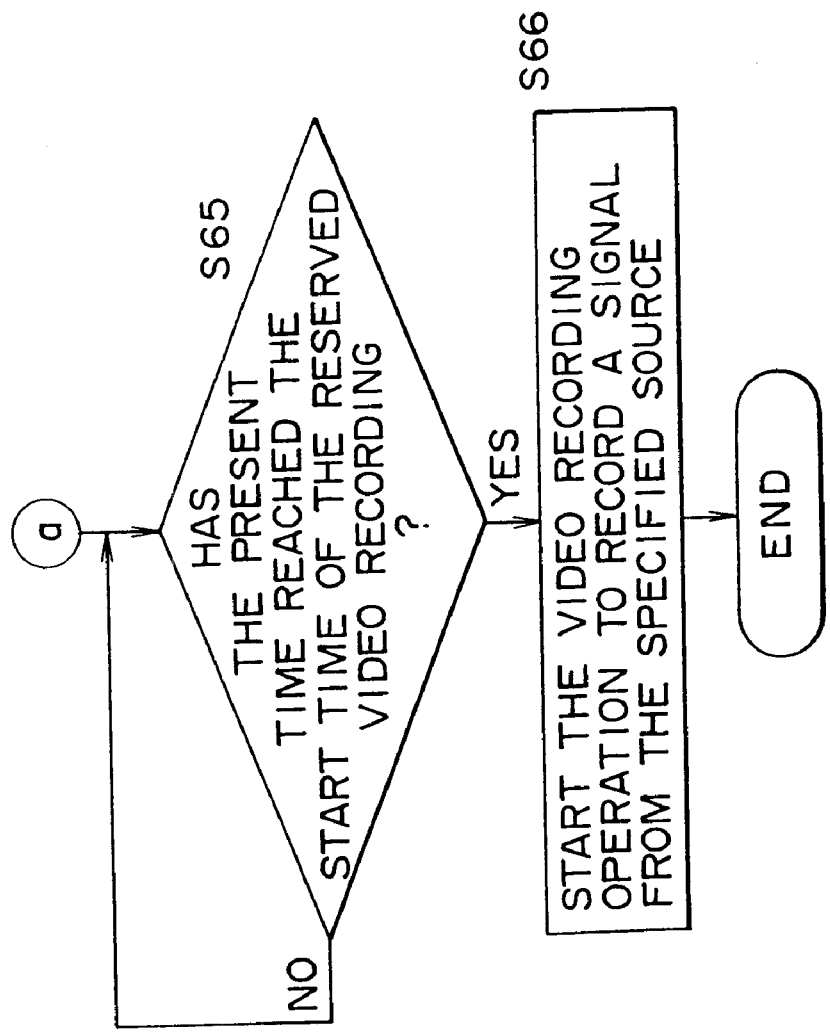

The following is a description of processing to carry out reserved video recording on an optical disc 1 mounted on an optical-disc apparatus with such information on a video-recording reservation already recorded on the disc 1 with reference to a flowchart shown in FIG. 45.

As shown in the figure, the processing begins with a step S60 at which the CPU 21 forms a judgment as to whether or not an optical disc 1 has been inserted into the optical-disc apparatus. If an optical disc 1 has not been inserted, the formation of the judgment is repeated till an optical disc 1 is inserted. As the outcome of the judgment formed at the step S60 indicates that an optical disc 1 has been inserted, the flow of the processing goes on to a step S61. At the step S61, VOLUME.TOC is read out from the optical disc 1 and stored in the RAM unit 24 by the CPU 21. Then, the flow of the processing goes on to a step S62 at which resume ( ) is read out from VOLUME.TOC stored in the RAM unit 24.

Subsequently, the flow of the processing goes on to a step S63 at which the CPU 21 forms a judgment as to whether or not information on a video-recording reservation is included in resume ( ). If no information on a video-recording reservation is included in resume ( ), the flow of the processing proceeds to a step S67 to carry out the ordinary resume playback processing shown in FIG. 41. If information on a video-recording reservation is found included in resume ( ), on the other hand, the flow of the processing proceeds to a step S64.

At the step S64, the CPU 21 controls the OSD control circuit 9 to generate a message showing an inquiry about whether or not to put the video recorder in a wait state till execution of the reserved video recording. The message is output from the synthesis circuit 8 to the display unit by way of the output terminal P1 to be displayed to the user. In response to the displayed message, the user enters a command by operating the input unit 14. If the CPU 21 judges the command entered by the user to be a command requesting another operation, that is, a command ignoring the information on a video-recording reservation, the flow of the processing continues to a step S68 at which the CPU 21 starts a resumed recording/playback other than the video-recording reservation, that is, the ordinary resume playback processing shown in FIG. 41. If the user specifies that the video recorder be put in a wait state till execution of the reserved video recording, on the other hand, the flow of the processing goes on to a step S65.

At the step S65, the video recorder enters a wait state. To put it in detail, the CPU 21 forms a judgment as to whether the present time has reached a video-recording start time included in the information on a video-recording reservation repeatedly till the present time coincides with the video-recording start time. As the present time matches the video-recording start time, the flow of the processing proceeds to a step S66.

At the step S66, the CPU 21 starts an operation to record a signal from an input channel specified in the information on a video-recording reservation.

The above description explains a procedure up to a start of a video-recording operation using information on a video-recording reservation included in extended resume-function related information recorded on an optical disc 1.

As described above, the present invention is applied to an optical-disc apparatus. However, the present invention can also be applied to operations to record and play back information into and from a recording medium other than an optical disc.

It should be noted that, as a presentation medium for presenting computer programs to be executed to carry out the processing described above to the user, communication media such as a network and a satellite can be utilized in addition to recording media like a magnetic disc, a CD-ROM and a solid-state memory device.

In the recording apparatus, the recording method and the presentation medium according to the present invention, resume-function related information including at least a location on a recording medium accessed immediately prior to ejection of the recording medium from the recording apparatus as requested by an eject command is recorded into the recording medium. As a result, it is possible to provide a recording medium which allows an access to be made to a location on the recording medium accessed immediately prior to ejection of the recording medium from the recording apparatus in a state immediately prior to the ejection when the recording medium is mounted again on the recording apparatus.

In the playback apparatus, the playback method and the presentation medium according to the present invention, resume-function related information is read out from a recording medium when the recording medium is inserted into the playback apparatus and a location on the recording medium to be accessed is determined in accordance with the resume-function related information read out from the recording medium. As a result, an access can be made to a location on a recording medium accessed immediately prior to ejection of the recording medium from the playback apparatus with a high degree of reliability even if the recording medium is remounted on a different playback apparatus.

In the recording/playback apparatus, the recording/playback method and the presentation medium according to the present invention, resume-function related information including at least a location on a recording medium accessed immediately prior to ejection of the recording medium from the recording/playback apparatus as requested by an eject command is recorded into the recording medium. In addition, the resume-function related information is read out back from the recording medium when the recording medium is inserted into the recording/playback apparatus and a location on the recording medium to be accessed is determined in accordance with the resume-function related information read out from the recording medium. As a result, it is possible to provide a recording medium which allows an access to be made to a location on the recording medium accessed immediately prior to ejection of the recording medium from the recording/playback apparatus as a matter of course if the recording medium is mounted again on the same recording/playback apparatus, or even if the recording medium is remounted on a different recording/playback apparatus.

What is claimed is:

1. A recording apparatus for recording information on a removable recording medium loaded therein, comprising:

recording means for recording information to a designated location on said recording medium;

ejecting means for ejecting said recording medium;

storage means for storing resume information indicative of at least a location on said recording medium accessed by said recording means immediately prior to ejecting said recording medium; and control means for controlling said recording means to record said resume information, stored in said storage means, on said recording medium before said recording medium is ejected.

2. The recording apparatus of claim 1, wherein said resume information includes status information indicative of the status of said recording apparatus immediately prior to ejecting said recording medium.

3. The recording apparatus of claim 1, wherein said resume information includes operation information indicative of a type of operation to be executed.

4. The recording apparatus of claim 3, wherein said type of operation includes a recording function.

5. The recording apparatus of claim 4, wherein said recording function includes at least one of an append mode and an overwriting recording mode.

6. The recording apparatus of claim 3, wherein said type of operation includes a reproducing function.

7. The recording apparatus of claim 6, wherein said reproducing function includes at least one of playback mode and an autoplay mode.

8. A method of recording information on a removable recording medium loaded into a recorder, comprising the steps of:

recording information to a designated location on said recording medium;

ejecting said recording medium;

storing resume information indicative of at least a location on said recording medium accessed by said recorder immediately prior to ejecting said recording medium; and controlling the recorder to record said stored resume information on said recording medium before said recording medium is ejected.

9. The method of claim 8, wherein said resume information includes status information indicative of the status of said recorder immediately prior to ejecting said recording medium.

10. The method of claim 8, wherein said resume information includes operation information indicative of a type of operation to be executed.

11. The method of claim 8, wherein said type of operation includes a recording function.

12. The method of claim 11, wherein said recording function includes at least one of an append mode and an overwriting recording mode.

13. The method of claim 8, wherein said type of operation includes a reproducing function.

14. The method of claim 13, wherein said reproducing function includes at least one of playback mode and an autoplay mode.

15. A reproducing apparatus for reproducing information that had been recorded on a removable recording medium prior to ejection of that recording medium from a recorder, said apparatus comprising;

reproducing means for reproducing information from a designated location on said recording medium;

first control means for controlling said reproducing means to read out resume information from said recording medium indicative of at least a location on said recording medium accessed by said recorder immediately prior to said ejection of said recording medium, said resume information having been recorded on said recording medium prior to ejection of the recording medium from the recorder; and second control means for controlling said reproducing means according to said resume information.

16. The reproducing apparatus of claim 15, wherein said resume information includes status information indicative of the status of said recorder immediately prior to ejecting said recording medium.

17. The reproducing apparatus of claim 15, wherein said resume information includes operation information indicative of a type of operation to be executed.

18. The reproducing apparatus of claim 15, wherein said type of operation includes a recording function.

19. The reproducing apparatus of claim 18, wherein said recording function includes at least one of an append mode and an overwriting recording mode.

20. The reproducing apparatus of claim 15, wherein said type of operation includes a reproducing function.

21. The reproducing apparatus of claim 20, wherein said reproducing function includes at least one of playback mode and an autoplay mode.

22. A method of reproducing information that had been recorded on a removable recording medium prior to ejection of that recording medium from a recorder, comprising the steps of:

reproducing information from a designated location on said recording medium;

reading out resume information from said recording medium indicative of at least a location on said recording medium accessed by the recorder immediately prior to said ejection of said recording medium, said resume information having been recorded on said recording medium prior to ejection of the recording medium from the recorder; and controlling the reproduction of information according to said resume information.

23. The method of claim 22, wherein said resume information includes status information indicative of the status of said recorder immediately prior to ejecting said recording medium.

24. The method of claim 22, wherein said resume information includes operation information indicative of a type of operation to be executed.

25. The method of claim 22, wherein said type of operation includes a recording function.

26. The method of claim 25, wherein said recording function includes at least one of an append mode and an overwriting recording mode.

27. The method of claim 22, wherein said type of operation includes a reproducing function.

28. The method of claim 27, wherein said reproducing function includes at least one of playback mode and an autoplay mode.

29. A recording and reproducing apparatus for recording information on a removable recording medium loaded therein and for reproducing information from that recording medium, comprising:

a recorder, including:

recording means for recording information to a designated location on said recording medium;

ejecting means for ejecting said recording medium;

storage means for storing resume information indicative of at least a location on said recording medium accessed by said recording means immediately prior to ejecting said recording medium; and control means for controlling said recording means to record said resume information, stored in said storage means, on said recording medium prior to ejection of the recording medium from the recorder; and a reproducer, including:

reproducing means for reproducing information from a designated location on said recording medium;

a first controller for controlling said reproducing means to read out resume information from said recording medium indicative of at least a location on said recording medium accessed by said recorder immediately prior to said ejection of said recording medium; and a second controller for controlling said reproducing means according to said resume information.

30. The recording and reproducing apparatus of claim 29, wherein said resume information includes status information indicative of the status of said recorder immediately prior to ejecting said recording medium.

31. The recording and reproducing apparatus of claim 29, wherein said resume information includes operation information indicative of a type of operation to be executed.

32. The recording and reproducing apparatus of claim 29, wherein said type of operation includes a recording function.

33. The recording and reproducing apparatus of claim 32, wherein said recording function includes at least one of an append mode and an overwriting recording mode.

34. The recording and reproducing apparatus of claim 29, wherein said type of operation includes a reproducing function.

35. The recording and reproducing apparatus of claim 34, wherein said reproducing function includes at least one of playback mode and an autoplay mode.

36. A method of recording information on a removable recording medium loaded into a recording and reproducing apparatus and reproducing information from that recording medium, comprising the steps of:

recording information to a designated location on said recording medium;

ejecting said recording medium;

storing resume information indicative of at least a location on said recording medium at which information was recorded immediately prior to ejecting said recording medium;

recording said stored resume information on said recording medium prior to ejection of the recording medium from the recording and reproducing apparatus;

reproducing information from a designated location on said recording medium;

reading out resume information from said recording medium indicative of at least a location on said recording medium at which information was recorded immediately prior to said ejection of said recording medium; and controlling reproducing of information according to said resume information.

37. The method of claim 36, wherein said resume information includes status information indicative of the status of said recording and reproducing apparatus immediately prior to ejecting said recording medium.

38. The method of claim 36, wherein said resume information includes operation information indicative of a type of operation to be executed.

39. The method of claim 36, wherein said type of operation includes a recording function.

40. The method of claim 39, wherein said recording function includes at least one of an append mode and an overwriting recording mode.

41. The method of claim 36, wherein said type of operation includes a reproducing function.

42. The method of claim 41, wherein said reproducing function includes at least one of playback mode and an autoplay mode.

43. A computer program for controlling a recorder to record information on a removable recording medium loaded into the recorder, so that the recorder:

records information to a designated location on said recording medium;

ejects said recording medium;

stores resume information indicative of at least a location on said recording medium accessed by said recorder immediately prior to ejecting said recording; and controls the recorder to record said stored resume information on said recording medium prior to ejection of the recording medium from the recorder.

44. The computer program of claim 43, wherein said resume information includes status information indicative of the status of said recorder immediately prior to ejecting said recording medium.

45. The computer program of claim 43, wherein said resume information includes operation information indicative of a type of operation to be executed.

46. The computer program of claim 43, wherein said type of operation includes a recording function.

47. The computer program of claim 46, wherein said recording function includes at least one of an append mode and an overwriting recording mode.

48. The computer program of claim 43, wherein said type of operation includes a reproducing function.

49. The computer program of claim 48, wherein said reproducing function includes at least one of playback mode and an autoplay mode.

50. A computer program for controlling a reproducer to reproduce information that had been recorded on a removable recording medium prior to ejection of that recording medium from a recorder so that the reproducer:

reproduces information from a designated location on said recording medium;

reads out resume information from said recording medium indicative of at least a location on said recording medium accessed by the recorder immediately prior to said ejection of said recording medium, said resume information having been recorded on said recording medium prior to ejection of the recording medium from the recorder; and controls the reproduction of information according to said resume information.

51. The computer program of claim 50, wherein said resume information includes status information indicative of the status of said recorder immediately prior to ejecting said recording medium.

52. The computer program of claim 50, wherein said resume information includes operation information indicative of a type of operation to be executed.

53. The computer program of claim 50, wherein said type of operation includes a recording function.

54. The computer program of claim 53, wherein said recording function includes at least one of an append mode and an overwriting recording mode.

55. The computer program of claim 50, wherein said type of operation includes a reproducing function.

56. The computer program of claim 55, wherein said reproducing function includes at least one of playback mode and an autoplay mode.

57. A computer program for controlling a recorder to record information on a removable recording medium loaded into the recorder, so that the recorder:

records information to a designated location on said recording medium;

ejects said recording medium;

stores resume information indicative of at least a location on said recording medium accessed by said recorder immediately prior to ejecting said recording medium; and controls the recorder to record said stored resume information on said recording medium prior to ejection of the recording medium from the recorder; and the program controls a reproducer to reproduce information that had been recorded on a recording medium prior to ejection of that recording medium from a recorder so that the reproducer:

reproduces information from a designated location on said recording medium; reads out resume information from said recording medium indicative of at least a location on said recording medium accessed by the recorder immediately prior to said ejection of said recording medium; and controls the reproduction of information according to said resume information.

58. The computer program of claim 57, wherein said resume information includes status information indicative of the status of said recorder immediately prior to ejecting said recording medium.

59. The computer program of claim 57, wherein said resume information includes operation information indicative of a type of operation to be executed.

60. The computer program of claim 57, wherein said type of operation includes a recording function.

61. The computer program of claim 60, wherein said recording function includes at least one of an append mode and an overwriting recording mode.

62. The computer program of claim 57, wherein said type of operation includes a reproducing function.

63. The computer program of claim 62, wherein said reproducing function includes at least one of playback mode and an autoplay mode.

\* \* \* \* \*